(12) United States Patent
Taka et al.

(10) Patent No.: US 6,968,148 B2
(45) Date of Patent: Nov. 22, 2005

(54) IMAGE ADJUSTING METHOD AND IMAGE FORMING APPARATUS

(75) Inventors: Kyosuke Taka, Nara (JP); Yoshikazu Harada, Nara (JP); Norio Tomita, Yamatokooriyama (JP); Takaharu Motoyama, Kashihara (JP); Nobuo Manabe, Yamatokooriyama (JP); Toshio Yamanaka, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 81 days.

(21) Appl. No.: 10/658,484

(22) Filed: Sep. 8, 2003

(65) Prior Publication Data

US 2004/0046981 A1    Mar. 11, 2004

(30) Foreign Application Priority Data

Sep. 10, 2002  (JP) ............................. 2002-264722
Sep. 20, 2002  (JP) ............................. 2002-276299

(51) Int. Cl.$^7$ ........................................... G03G 15/01
(52) U.S. Cl. .................... 399/301; 399/40; 399/231
(58) Field of Search .......................... 399/30, 39, 40, 399/49, 60, 223, 231, 301, 38

(56) References Cited

U.S. PATENT DOCUMENTS 6,148,168 A * 11/2000 Hirai et al. ................ 399/301

FOREIGN PATENT DOCUMENTS

| JP | 10-213940 | 8/1998 |
|----|-----------|--------|
| JP | 10-260567 | 9/1998 |
| JP | 2000-081744 | 3/2000 |

* cited by examiner

Primary Examiner—Hoang Ngo
(74) Attorney, Agent, or Firm—David G. Conlin; David A. Tucker; Edwards & Angell, LLP

(57) ABSTRACT

Images based on each of a plurality of color components are formed; the formed images are transferred on each transfer medium to form an image quality determining image; the image quality of the image quality determining image is determined on the basis of the detected density thereof, an adjustment image is formed by overlaying and transferring an image of other color component to be adjusted to the reference image of the reference color image out of the plurality of color components, on the transfer medium; the density of the adjustment image is detected; and the image forming position of the other color component to be adjusted is adjusted on the basis of the detected density. At the time of executing the color matching adjustment process for detecting the overlaid state of color component images, it is determined whether a specified time has passed or not since the previous adjustment process, a specified number of images are formed or not, environments are changed or not, and the power source is turned on or off or not. When it is predicted that the quality of the formed image is out of an appropriate range, a quality checking image is formed, its image quality is checked, and the color matching adjustment process is executed only when it is within an appropriate range.

22 Claims, 25 Drawing Sheets

FIG. 11
DETECTION PATTERN 2
(FOR MAIN SCANNING)
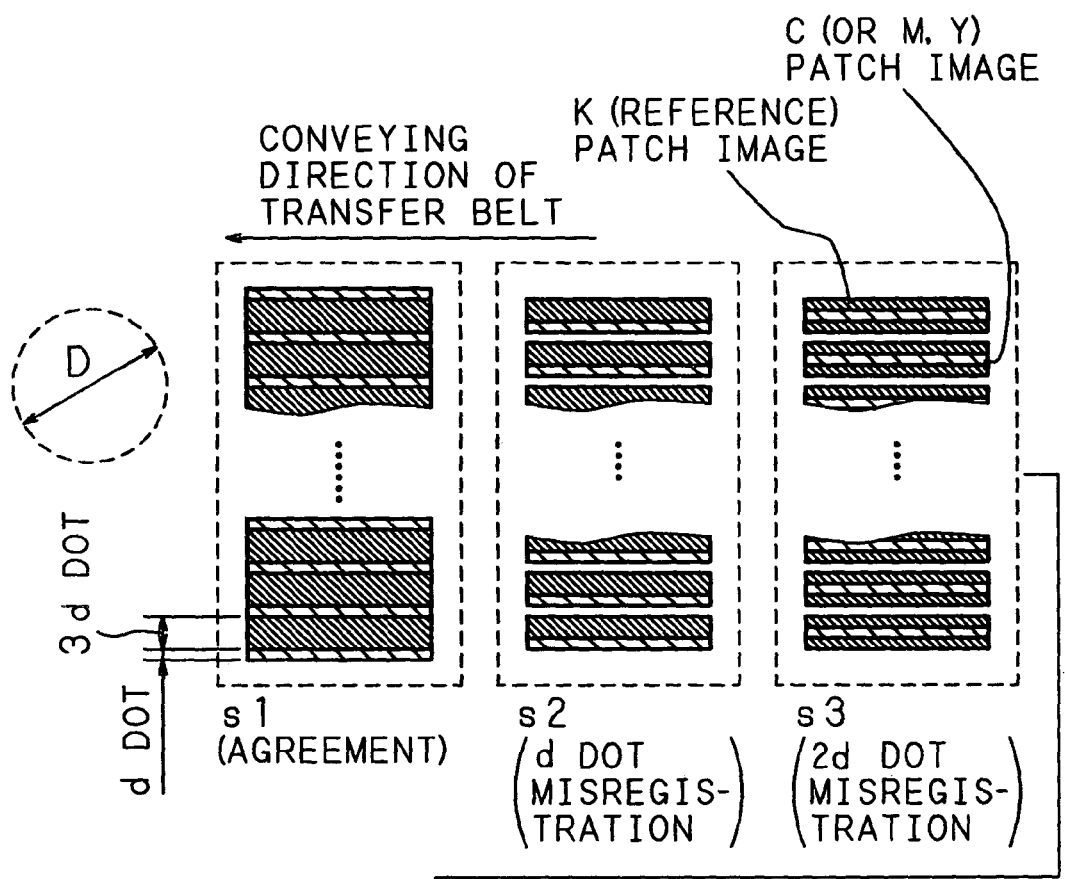
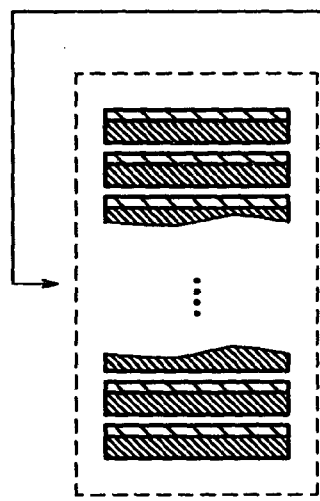

VERIFICATION OF K SOLID DENSITY

IMAGE ADJUSTING METHOD AND IMAGE FORMING APPARATUS

BACKGROUND OF THE INVENTION

The invention relates to an adjusting method such as color matching adjustment for an image forming apparatus by electrophotographic system and an image forming apparatus and, more particularly, to an image adjusting method and image forming apparatus for automatically adjusting color misregistration of multicolor image occurring at the time of forming a multicolor image by overlaying color component images formed on an image carrier (image forming means; photosensitive drum) or transfer carrier (transfer medium: transfer belt, paper).

An image forming apparatus such as a digital color copier or digital color printer is designed to separate inputted data into a plurality of color components and process the image, and form a multicolor image by overlaying images for each color component. At the time of forming a multicolor image, when images of each color component are not overlaid correctly, color misregistration occurs in the formed multicolor image, and the image quality may be lowered. In particular, to enhance the forming speed of multicolor image, in an image forming apparatus having an image forming unit for each color component, an image of each color component is formed in each image forming unit, and formed images of color components are overlaid sequentially, so that a multicolor image may be formed. In such image forming apparatus, a transfer position of image of each color component is likely to be deviated, and color misregistration of multicolor image is a serious problem.

Accordingly, in the image forming apparatus, in order to overlay the images of color components at high precision, by executing a color matching adjustment (registration adjustment) for adjusting the color misregistration of multicolor image, it is intended to form a favorable multicolor image free from color misregistration. In color matching adjustment, usually, the misregistration of an image forming position of other color component with respect to the image forming position of a reference color component is detected by using an optical detector. The adjusting amount is determined on the basis of the result of this detection and, according to this adjusting amount, the timing for forming the image of each color component is adjusted so as to match the transfer position of image of each color component. In order to determine the adjusting amount, generally, the image of each color component is transferred at the same timing, and the distance between transfer positions of color components is detected or the density of the multicolor image overlaying the color components is detected.

For example, in the image forming apparatus disclosed in Japanese Patent Application Laid-Open No. 10-213940 (1998), the distance between transfer positions of images of color components is detected, and it is adjusted according to the detected misregistration amount of transfer position. That is, the distance between the image formed by reference color component and the image formed by other color component is detected by a detector, and the misregistration amount of the transfer position of images of color components is determined on the basis of the detected distance, and thereby the color misregistration is adjusted.

Japanese Patent Application Laid-Open No. 2000-81744 discloses an image forming apparatus designed to adjust the color misregistration by measuring the density of multicolor image by overlaying images of color components and adjusting so that the measured density may coincide with the density in the correctly overlaid state of images of color components. In this image forming apparatus, to enhance the precision of adjustment, images of color components are formed by repeating a plurality of same images. As the same images, a plurality of line images are formed, and the density of multicolor line images is detected by a detector, and the overlaid state of the line images of color components is obtained. When the density of the multicolor line images detected by the detector is within the specified density range, it is determined that the line images of color components are overlaid correctly, and the color matching adjustment is executed so that the image may be formed in this overlaid state.

When forming images, measuring the position and density of formed images, detecting the relative position of the color image requiring adjustment on the basis of a reference color image, and executing the color matching adjustment in this manner, the result of detection depends very much on the quality of the formed images (size, density, edge state). By contrast, Japanese Patent Application Laid-Open No. 10-260567(1998) discloses a technique of executing the color matching adjustment by forming an image for density control, adjusting the image forming condition when its density does not reach the specified level, and matching the color by the image for color matching adjustment.

However, in the image forming apparatus of tandem system constituted by a plurality of image forming units for forming images of color components arranged in line, the distance from the image forming units to the detector for detecting the image for adjustment is very long, and once an image for color matching is formed before checking the density as the detector detects the image for density control, wasteful image forming is executed when the density does not reach the specified level.

Besides, the image forming apparatus disclosed in Japanese Patent Application Laid-Open No. 2000-81744 is designed to execute the image color matching adjustment by the image for density detection, and it consumes much developer.

BRIEF SUMMARY OF THE INVENTION

The invention is devised in the light of such circumstance, and it is therefore an object thereof to provide an image adjusting method and image forming apparatus capable of forming images for image quality determination and color matching adjustment, without waste of developer, and executing color matching adjustment efficiently and in a short time.

It is another object of the invention to provide an image adjusting method and image forming apparatus capable of suppressing wasteful consumption of developer, and executing color matching adjustment efficiently and in a short time.

In the image adjusting method and image forming apparatus of the invention, images are formed on the basis of each one of a plurality of color components, and the formed images are transferred on each transfer medium so as to be overlaid. The density of an image quality determining image transferred and formed on the transfer medium is detected, and the image quality of the image quality determining image is determined on the basis of the detected density. On a reference image as the reference color component, out of the plurality of color components, an image of other color component to be adjusted is overlaid and transferred on the transfer medium, and the density of thus formed adjustment image is detected, and the image forming position of the other color component to be adjusted is adjusted on the basis of the detected density. At this time, after forming the image quality determining image, the adjustment image is formed.

As a result, without waste of developer, the images for image quality determination and color matching adjustment can be formed, and the image adjusting method and image forming apparatus capable of executing color matching adjustment efficiently and in a short time can be realized. Still more, immediately before color matching adjustment, the quality of the image for color matching adjustment can be checked in advance by the image quality determining image and, when the image quality is excellent, the color matching adjustment can be executed immediately, and an efficient adjustment is realized. When the image quality is inferior, the color matching can be interrupted immediately before making error by executing color matching adjustment. Moreover, since the image quality is checked by forming an image for image quality determination, the image quality can be checked at high precision.

In the image adjusting method and image forming apparatus of the invention, after determining the image quality, the adjustment image is formed in succession. Therefore, in case of inferior image quality, color matching adjustment can be stopped before forming an image for color matching adjustment, wasteful image is not formed and it is economical. In the case of an excellent image quality, forming of an image for color matching adjustment can be started in succession, and the color matching can be adjusted promptly, the adjustment time is not prolonged, and efficient color matching adjustment can be executed.

In the image adjusting method and image forming apparatus of the invention, the image quality determining image is formed by arranging a plurality of images of color components to be adjusted at a first interval in overlap with the image of the reference color component. At this time, depending on the color of the developer on the transfer belt, certain colors are hard to be distinguished from the belt surface by the detector, and generally in the case of the detector designed to detect by regular reflection light, a black image (K image) can be detected favorably, but it is hard to distinguish the color images (C, M, Y images) from the surface of the transfer belt. Accordingly, when the density of the image formed on the transfer belt is detected by a color image alone, it is hard to check the image quality, but by forming a reference image (K image) as the base and forming color images thereon at a specific interval intermittently, the density of the color images can be detected.

In the image adjusting method and image forming apparatus of the invention, adjustment images are formed by overlaying a plurality of images to be adjusted on a plurality of reference images arranged at a second interval, and the first interval and second interval are equal to each other; therefore, the quality of color images can be checked in the same shape as in the case of adjustment of color images for adjusting the adjustment images for color matching adjustment, so that the image quality can be checked at high precision.

In the image adjusting method and image forming apparatus of the invention, since the image quality determining image includes a portion formed only of the image of the reference color component, the quality such as density of the K image can be checked by the portion forming only the image (K image) of the reference color component.

In the image adjusting method and image forming apparatus of the invention, the adjustment image is not formed when the result of image quality determination does not satisfy the specified quality. Therefore, when the quality of the image quality check image is inferior, it is predicted that correct adjustment is not executed when color matching is executed, and by stopping color matching adjustment without forming color matching adjustment image, wasteful image forming can be prevented, and consumption of useless developer can be decreased.

In the image adjusting method and image forming apparatus of the invention, when receiving information telling the need of adjustment of image forming position of each color component image, it is determined whether or not to execute a detection process for detecting the forming state of each color component image, and when it is determined to execute, an image for detection is formed, and the forming state is detected, and an image for adjustment is formed, and the forming position of each color component image is adjusted. Therefore, when the quality of the formed image is predicted to be out of an appropriate range, it is determined whether or not to detect by forming an image for checking the quality (image for detection), and when it is predicted to be within an appropriate range, without making image for checking the quality, an image for color matching adjustment (image for adjustment) is formed directly, and the color matching adjustment is processed by detecting the forming position of each color component image; therefore, wasteful image formation can be eliminated as far as possible, and an economical and efficient color matching adjustment can be realized.

In the image adjusting method and image forming apparatus of the invention, it is determined whether or not to execute detection process on the basis of the elapse of time after execution of detection process. As the elapse of time after the adjustment process is longer, it is considered that the conditions have been changed such as the temperature and other environmental states in the image forming apparatus, density of the developer, and fatigue of the photosensitive body, and lowering of image quality is predicted; therefore, the adjustment process is performed when the elapse of time is longer or the adjustment process is skipped when the elapse of time is shorter, so that wasteful image formation can be eliminated as far as possible.

In the image forming apparatus of the invention, on the basis of the result of detection of the forming state of the image for detection, it is determined whether or not to control the forming condition of each color component image. When adjusting the image forming position of each color component image, it is possible to adjust at high precision if executed right after finishing the control of the forming condition (adjusting process), but in the adjusting process, the forming condition is determined by forming an image for adjusting process. Therefore, when the quality of the color component image to be formed is predicted to be within an applicable range, the adjusting process can be omitted, and wasteful image is not formed, and the developer can be saved, and the adjustment time is shortened.

In the image forming apparatus of the invention, it is determined whether or not to execute the detection process on the basis of the number of times of image formation. As the number of times of image formation increases from execution of the adjustment process, it is considered that the conditions have been changed such as the temperature and other environmental states in the image forming apparatus, density of the developer, and fatigue of the photosensitive body, and lowering of image quality is predicted; therefore, the adjustment process is performed when the number of times of image formation is many or the adjustment process is skipped if the number of times is small, so that wasteful image formation can be eliminated as far as possible.

In the image forming apparatus of the invention, it is determined whether or not to execute the detection process depending on environmental changes in temperature, humidity or the like. As the environmental conditions in the image forming apparatus are changed after execution of the adjustment process, the characteristics of means, characteristics of the photosensitive body, and others are considered, and lowering of image quality is predicted; therefore, the adjustment process is performed when the environmental change is large or the adjustment process is skipped when the environmental change is small, so that wasteful image formation can be eliminated as far as possible.

In the image forming apparatus of the invention, it is determined whether or not to execute the detection process depending on the number of times of turning on the power source. As the power source of the image forming apparatus is turned on and off many times after execution of the adjustment process, some units of the process section may be replaced at the time of power cut-off, and effects on the image quality may be predicted; therefore, the adjustment process is performed when the power source is turned on and off many times or the adjustment process is skipped when the number of times is small, so that wasteful image formation can be eliminated as far as possible.

In the image forming apparatus of the invention, as the image for detection, an image overlaying a lattice image by one color component is used. Hence, image forming states such as the density of image, thickness, edge and the like can be detected easily.

In the image forming apparatus of the invention, as the image for color matching, an image overlaying a lattice image by each color component is used. Hence, misregistration of image of each color component can be detected easily.

The above and further objects and features of the invention will more fully be apparent from the following detailed description with accompanying drawings.

BRIEF DESCRIPTION OF THE SEVERAL VIEWS OF THE DRAWINGS

FIG. 11 is an explanatory diagram showing an example of a reference line and adjustment line in a second color matching adjustment in a main scanning direction formed on a transfer belt;

DETAILED DESCRIPTION OF THE INVENTION

Hereinafter, description will be specifically given of embodiments of the invention with reference to the drawings.

Figure 1:
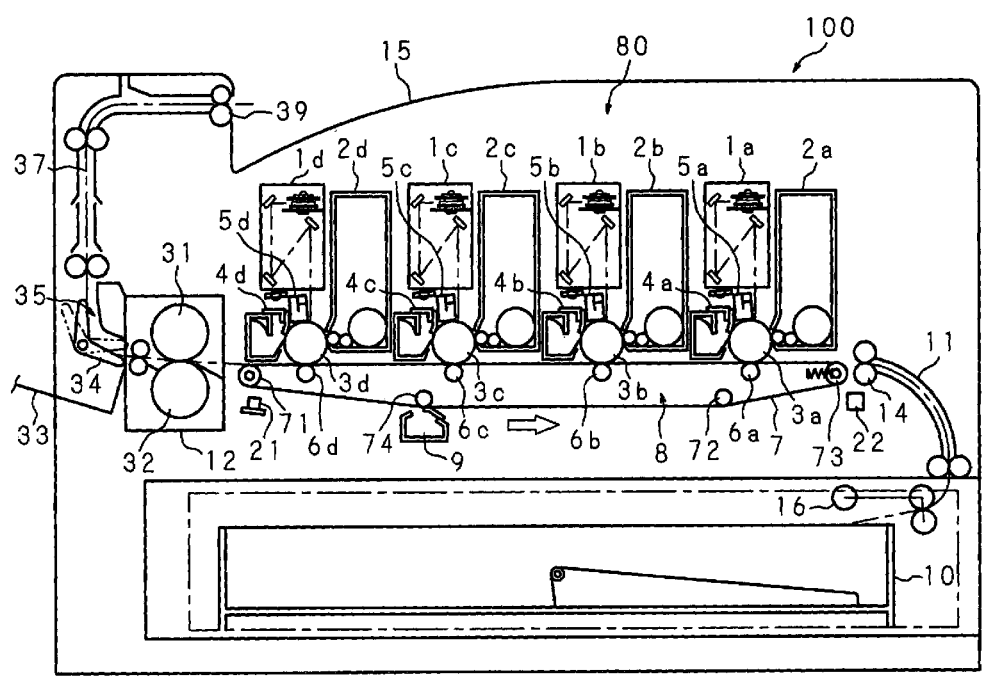
FIG. 1 is a sectional view showing an entire structure of an image forming apparatus of the invention.

FIG. 1 is a sectional view showing an entire structure of an image forming apparatus of the invention. In the figure, reference numeral 100 is an image forming apparatus of the invention, and is specifically a digital color printer, a digital color copier, or a combined machine thereof. The image forming apparatus 100 comprises, as shown in FIG. 1, an image forming station 80, a transfer conveying belt unit 8, a registration detecting sensor 21 and a temperature/humidity sensor 22.

The image forming station 80 of the image forming apparatus 100 comprises, in order to form a multicolor image by using black (K), cyan (C), magenta (M), and yellow (Y) colors, exposure units 1*a*, 1*b*, 1*c*, 1*d* for forming four latent images corresponding to individual colors, developing units 2*a*, 2*b*, 2*c*, 2*d* for developing the latent images of individual colors, photosensitive drums 3*a*, 3*b*, 3*c*, 3*d*, cleaner units 4*a*, 4*b*, 4*c*, 4*d*, and charging units 5*a*, 5*b*, 5*c*, 5*d*.

Symbols a, b, c, d attached to the reference numerals correspond respectively to the black (K), cyan (C), magenta (M), and yellow (Y) colors.

Hereinafter, except for a case of describing a member corresponding to a specific color, these members are simply mentioned as exposure unit 1, developing unit 2, photosensitive drum 3, cleaner unit 4, and charging unit 5.

The exposure unit 1 is a writing head or laser emission unit having an array of luminous elements such as EL (Electro Luminescence) and LED (Light Emitting Diode), and a laser scanning unit (LSU) having a reflection mirror. In the image forming apparatus 100 shown in FIG. 1, the LSU is used. The exposure unit 1 exposes depending on the inputted image data, and forms an electrostatic latent image on the photosensitive drum 3 depending on the image data.

The developing unit 2 forms a sensible image from the electrostatic latent image formed on the photosensitive drum 3 by using toners of individual colors. The photosensitive drum 3 is disposed in the center of the image forming apparatus 100, and forms an electrostatic latent image or toner image depending on the inputted image data, on the surface. The cleaner unit 4 develops the electrostatic latent image formed on the surface of the photosensitive drum 3, transfers and, then, removes and collects the remaining toner on the photosensitive drum 3. The charging unit 5 uniformly charges the surface of the photosensitive drum 3 at a specified potential. The charging unit 5 is available in roller type or brush type contacting with the photosensitive drum 3, and charger type free from contact with the photosensitive drum 3. In the image forming apparatus 100 shown in FIG. 1, the charger type charging unit is used.

Beneath the photosensitive drum 3, disposed is the transfer conveying belt unit 8. The transfer belt unit 8 includes a transfer belt 7, a transfer belt driving roller 71, a transfer belt tension roller 73, transfer belt driven rollers 72, 74, transfer rollers 6a, 6b, 6c, 6d, and a transfer belt cleaning unit 9. The four transfer rollers 6a, 6b, 6c, 6d corresponding to individual colors are collectively mentioned as the transfer roller 6.

The transfer belt driving roller 71, transfer belt tension roller 73, transfer roller 6, and transfer belt driven rollers 72, 74 are designed to stretch the transfer belt 7, and rotate and drive the transfer belt 7 in the direction of a blank arrow shown in FIG. 1. The transfer roller 6 is rotatably supported in a housing of the transfer conveying belt unit 8, and it is composed of a metal shaft of 8 to 10 mm in diameter, and its surface is coated with a conductive elastic material such as EPDM (Ethylene Propylene Diene Monomer), foamed urethane or the like. The transfer roller 6, having such conductive elastic material, can apply a high voltage of reverse polarity of the toner charging polarity uniformly to a sheet of paper; therefore, the toner image formed on the photosensitive drum 3 is transferred on the transfer belt 7 or the paper conveyed as being adsorbed on the transfer belt 7.

The transfer belt 7 is about 100 $\mu$m in thickness, being formed of polycarbonate, polyimide, polyamide, polyvinylidene fluoride, polytetrafluoroethylene polymer, ethylene tetrafluoroethylene polymer or the like, and is provided to contact with the photosensitive drum 3. On the transfer belt 7 or the paper conveyed as being adsorbed on the transfer belt 7, toner images of colors formed on the photosensitive drum 3 are transferred sequentially, so that a multicolor toner image is formed. The transfer belt 7 is about 100 $\mu$m in thickness, and is formed as an endless loop by using a film. The transfer belt cleaning unit 9 removes and collects the toner for color matching adjustment directly transferred on the transfer belt 7, the toner for process control, and the toner adhered due to contact with the photosensitive drum 3.

In order to detect the patch image formed on the transfer belt 7, a registration detecting sensor 21 is provided at a position after the transfer belt 7 passes through the image forming station 80 and at a position before reaching the transfer belt cleaning unit 9. The registration detecting sensor 21 detects the density of the patch image formed on the transfer belt 7 in the image forming station 80. Herein, there are three types of patch image formed on the transfer belt 7, that is, an image used in process control (adjustment process) for controlling the image forming condition, an image for checking the quality, and an image for color matching adjustment.

In order to detect the temperature and humidity in the image forming apparatus 100, the temperature/humidity sensor 22 is installed in the vicinity of the process unit in a place small in temperature change and humidity change.

In the image forming station 80 of the image forming apparatus 100 having such a structure, the exposure unit 1 exposes at a specified timing on the basis of the inputted image data, so that an electrostatic latent image is formed on the photosensitive drum 3. In succession, the developing unit 2 makes a sensible image from the electrostatic latent image to form a toner image, and this toner image is transferred on the transfer belt 7 or the paper conveyed as being adsorbed on the transfer belt 7.

The transfer belt 7 is rotated and driven by the transfer belt driving roller 71, transfer belt tension roller 73, transfer belt driven rollers 72, 74, and transfer roller 6, and toner images of color components are sequentially overlaid and transferred on the paper conveyed as being adsorbed on the transfer belt 7 or on the transfer belt 7, so that a multicolor toner image is formed. When a multicolor toner image is formed on the transfer belt 7, this multicolor toner image is further transferred on the paper.

The image forming apparatus 100 further comprises a feed paper tray 10, discharge paper trays 15, 33, and a fixation unit 12, in addition to the structure relating to the color matching adjustment. The feed paper tray 10 is a tray for stocking image recording sheets. The discharge paper trays 15, 33 are trays for collecting image recorded sheets. The discharge paper tray 15 is provided on the upper part of the image forming apparatus 100, and collects image recorded sheets in a face-down state. The discharge paper tray 33 is provided on the side of the image forming apparatus 100, and collects image recorded sheets in a face-up state.

The fixation unit 12 includes a heat roller 31 and a pressure roller 32. The heat roller 31 is controlled to maintain a specified temperature by turning on and off heating means such as a heater lamp, on the basis of the temperature detection value by a temperature detector which is not shown. The heat roller 31 and pressure roller 32 hold and rotate the sheet on which the toner image is transferred, and the toner image is thermally compressed to the sheet by the heat of the heat roller 31.

Hereinafter, description will be given of an operation of the image forming apparatus 100 having such a structure.

In the case where image data is inputted to the image forming apparatus 100, the exposure unit 1 exposes according to the adjustment value found by the color matching adjustment depending on the inputted image data, and an electrostatic latent image is formed on the photosensitive drum 3. This electrostatic latent image is developed into a toner image by the developing unit 2. On the other hands, sheets stocked in the feed paper tray 10 are separated into each piece by a pickup roller 16, and conveyed into a paper conveying route 11, and once held on a resist roller 14. The resist roller 14 controls the leading end of the toner image on the photosensitive drum 3 at a timing to match with the leading end of the image forming region of the paper on the basis of the detection signal from a resist prediction switch which is not shown, and conveys the paper to the transfer belt 7 in harmony with the rotation of the photosensitive drum 3. The paper is adsorbed on the transfer belt 7 and conveyed.

Transfer of toner image from the photosensitive drum 3 to the paper is executed by the transfer roller 6 provided oppositely to the photosensitive drum 3 by way of the transfer belt 7. In the transfer roller 6, a high voltage of reverse polarity of the toner is applied, and the toner image is applied to the paper. Four toner images corresponding to the colors are sequentially overlaid on the paper conveyed by the transfer belt 7.

The paper is then conveyed into the fixation unit 12, and the toner image is fixed on the paper by thermal compression. A convey changeover guide 34 changes over the conveying routes, and the paper on which the toner image is fixed is conveyed to the discharge paper tray 33 or the discharge paper tray 15 by way of paper conveying routes 35, 37.

After the transfer to the paper is finished, the remaining toner on the photosensitive drum 3 is removed and collected by the cleaner unit 4. The transfer belt cleaning unit 9 removes and collects the toner depositing on the transfer belt 7, and finishes a series of image cleaning actions.

In this embodiment, the direct transfer system is employed, that is, the paper is held on the transfer belt 7, and the toner images formed on the photosensitive drums 3a to 3d are overlaid on the paper, but the image forming apparatus may be also realized by the intermediate transfer system in which the toner images formed on the photosensitive drums 3a to 3d are overlaid and transferred on the transfer belt 7, and transferred again in patch on the paper to form a multicolor image.

Figure 2:
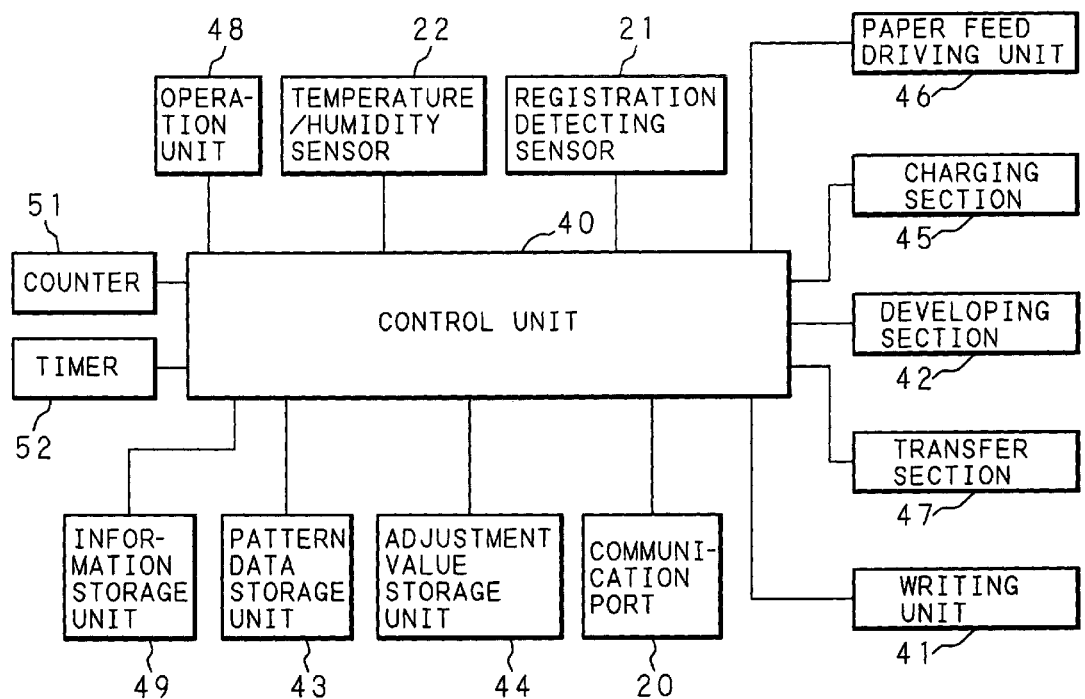
FIG. 2 is a block diagram showing an internal structure of the image forming apparatus of the invention.

FIG. 2 is a block diagram showing an internal structure of the image forming apparatus 100 of the invention. The image forming apparatus comprises a control unit 40 constituted of a CPU, and various hardware devices are connected through buses, such as communication port 20, registration detecting sensor 21, temperature/humidity sensor 22, writing unit 41, developing section 42, pattern data storage unit 43, adjustment value storage unit 44, charging section 45, paper feed driving unit 46, transfer section 47, operation unit 48, information storage unit 49, counter 51, and timer 52.

The writing unit 41 has the exposure unit 1, and controls the exposure unit 1 so that an electrostatic image based on the inputted image data may be formed on the photosensitive drum 3 by an instruction from the control unit 40. The developing section 42 has the developing unit 2, and controls the bias voltage of the developing roller so as to form a sensible image by toners of colors from the electrostatic image formed on the photosensitive drum 3 by an instruction from the control unit 40. The charging section 45 has the charging unit 5, controls the grid bias voltage of the charging unit 5 by an instruction from the control unit 40, and controls the surface potential of the photosensitive drum 3. The transfer section 47 includes the transfer belt 7, transfer belt driving roller 71, transfer belt tension roller 73, transfer belt driven rollers 72, 74, and transfer roller 6, drives the transfer belt driving roller 71 by an instruction from the control unit 40, rotates and drives the transfer belt 7 in a specified direction, and transfers the toner image formed on the photosensitive drum 3 on the transfer belt 7 or the paper adsorbed on the transfer belt 7.

The paper feed driving unit 46 includes the feed paper tray 10, pickup roller 16, and resist roller 14, and controls the pickup roller 16 and resists roller 14 so as to feed the sheets of paper stocked in the feed paper tray 10 one by one to the transfer belt 7 by an instruction from the control unit 40. The operation unit 48 has various button switches, cursor key, numeric keys and others, and is designed to accept desired inputs from the user such as the number of images to be formed and adjustment of image forming density. It is also designed to instruct execution of image matching adjustment. The information storage unit 49 stores various items of information for operating the control unit 40.

In the communication port 20, external devices are connected as required, such as scanner, facsimile equipment, personal computer, and other image input device. Image data entered from these external devices are temporarily stored in a graphic memory which is not shown, and the electrostatic latent image of image data stored in the graphic memory is formed on the photosensitive drum 3 by an instruction from the control unit 40. Various image data used in process control, image quality checking, and color matching adjustment are preliminarily stored in the pattern data storage unit 43. Adjustment values about deviation of color images obtained by executing the color matching adjustment are stored in the adjustment value storage unit 44.

The counter 51 counts the number of revolutions of the photosensitive drum 3 or the number of times of forming images, and the timer 52 starts after start of process control upon turning on the power source, and is reset at every execution of subsequent process control.

(First Embodiment)

In the image forming apparatus 100 in a first embodiment, at the time of color matching adjustment (registration adjustment), toner images of color components formed in the image forming station 80 are transferred on the transfer belt 7. At this time, a reference toner image (hereinafter, referred to as reference patch image) out of toner images of color components is transferred on the transfer belt 7, and then a toner image of other color component for adjustment of color misregistration (hereinafter, referred to as adjustment patch image) is transferred on this reference patch image.

Figure 3:
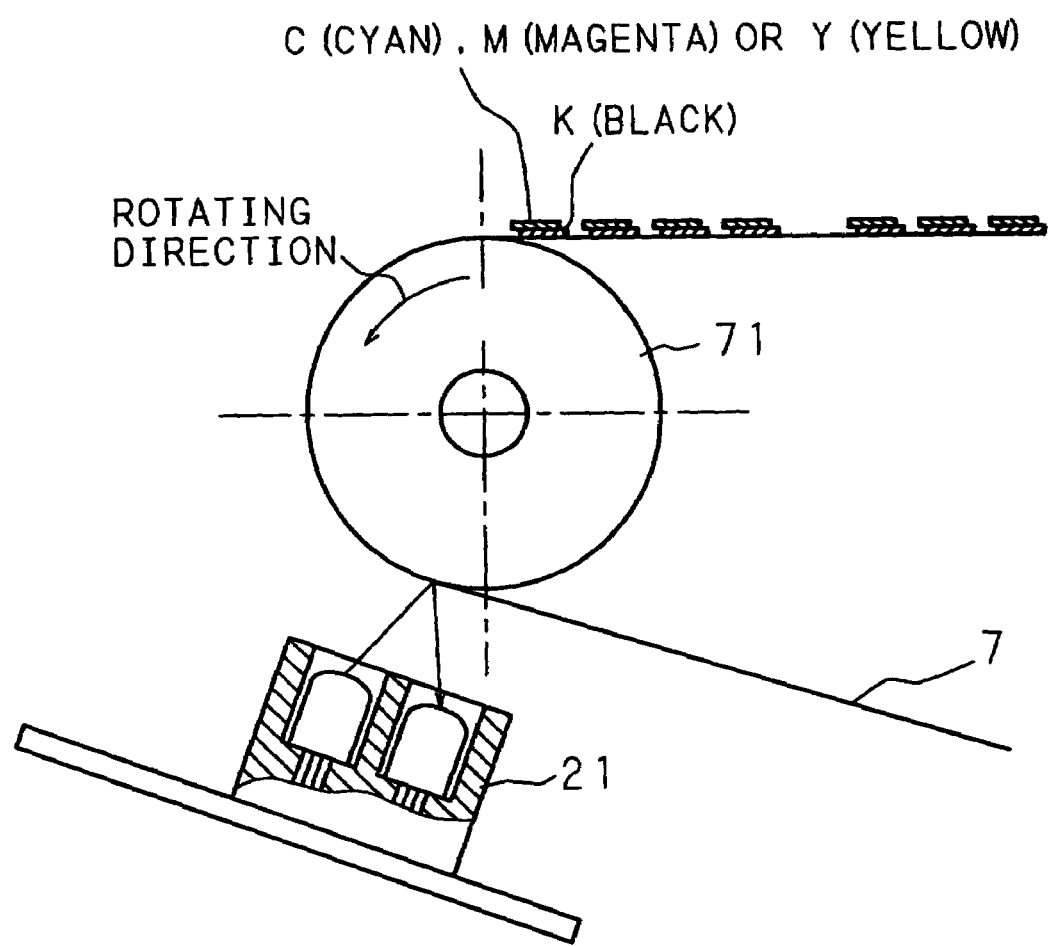
FIG. 3 is an explanatory diagram showing an example of relative positions of a registration detection sensor and a transfer belt.

The transfer belt 7 is rotated and driven by the transfer belt driving roller 71, and when the reference patch image K (black) and adjustment patch image C (cyan) formed on the transfer belt 7 reach the position of the registration detecting sensor 21 as shown in FIG. 3, the registration detecting sensor 21 detects the density of the reference patch image and adjustment patch image on the transfer belt 7. The registration detecting sensor 21 emits light to the transfer belt 7, detects the light reflected from the transfer belt 7, and detects the density of the reference patch image and adjustment patch image. On the basis of the result of detection, the exposure unit 1 adjusts the exposure timing, and adjusts the writing timing onto the photosensitive drum 3. This adjustment is executed similarly in other colors to be adjusted such as M (magenta) and Y (yellow).

In this embodiment, the reference patch image is K (black), but other color (C, M, Y) may be reference, and K is the object of adjustment in such a case. As shown in FIG. 3, the registration detecting sensor 21 is configured so that the relative positions of the exit position of the illumination light and the detection position of the reflection light may be parallel to each other in the conveying direction of the transfer belt 7, but it is not limited to this example alone. That is, the relative positions of the exit position of the illumination light and the detection position of the reflection light may be set, for example, perpendicular to the conveying direction of the transfer belt 7. In this embodiment, the process speed for image formation is 100 mm/sec, and the detection by the registration detecting sensor 21 is done in a sampling period of 2 msec.

Next, description will be specifically given of the color matching adjustment of the image forming apparatus 100 in the first embodiment. The color matching adjustment of the image forming apparatus 100 includes first to third color matching adjustments. Herein, the reference patch image is the toner image of K (black), and the adjustment patch image is the toner image of C (cyan), and the color matching adjustment range is supposed to be a portion of 99 dots (lines) in the conveying direction of the transfer belt 7 (dot 0 at start position and dot 99 at end position).

The colors of toner images used as reference patch image and adjustment patch image are not particularly specified, and any color may be used. The color matching adjustment range is not limited to 99 dots, but the range may be either wider or narrower. Moreover, it may be set to vary the range depending on the circumstance. Anyway, when the adjustment range is wider, the required registration adjustment time is longer, and when the adjustment range is narrower, a shorter time is required for registration adjustment.

(First Color Matching Adjustment)

Color matching adjustment by the image forming apparatus 100 is to form reference patch image and adjustment patch image formed of a plurality of lines in a perpendicular direction (hereinafter, referred to as main scanning direction) to the conveying direction of the transfer belt 7 (hereinafter, referred to as sub-scanning direction) on the transfer belt 7.

Figure 4:
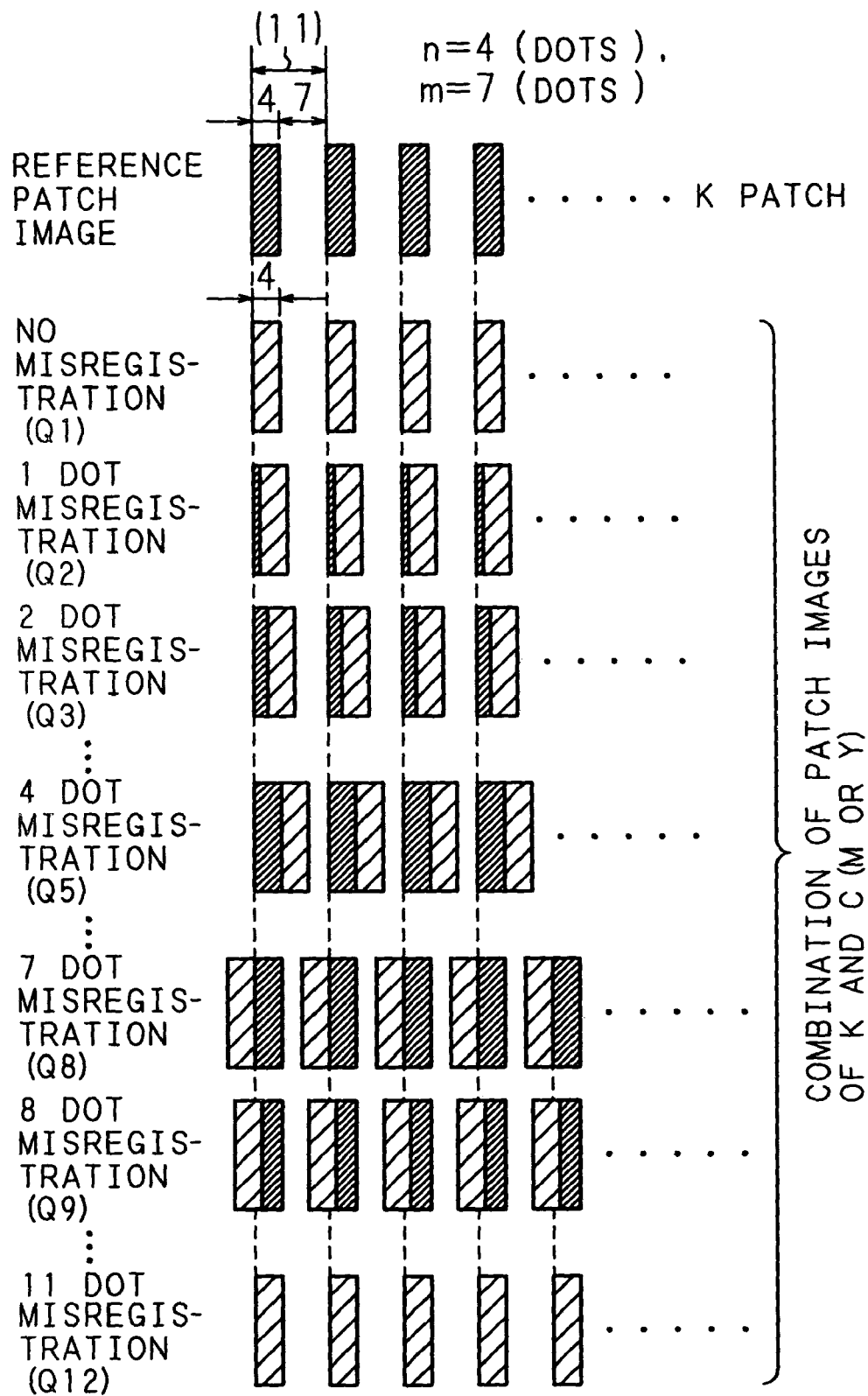
FIG. 4 is an explanatory diagram showing an example of a reference patch image (reference line) and adjustment patch image (adjustment line)

In the first color matching adjustment, as shown in FIG. 4, the pitch (m+n) (second interval) of image forming pattern is set, for example, in a total of 11 dots consisting of 4 dots of line width n and 7 dots of line interval m of each line, and a reference patch image (hereinafter, referred to as reference line) is formed on the transfer belt 7 (K patch in FIG. 4). After forming the reference line, an adjustment patch image (hereinafter, referred to as adjustment line) having same line width n and line interval m as the reference line is further formed on this reference line.

Figure 5:
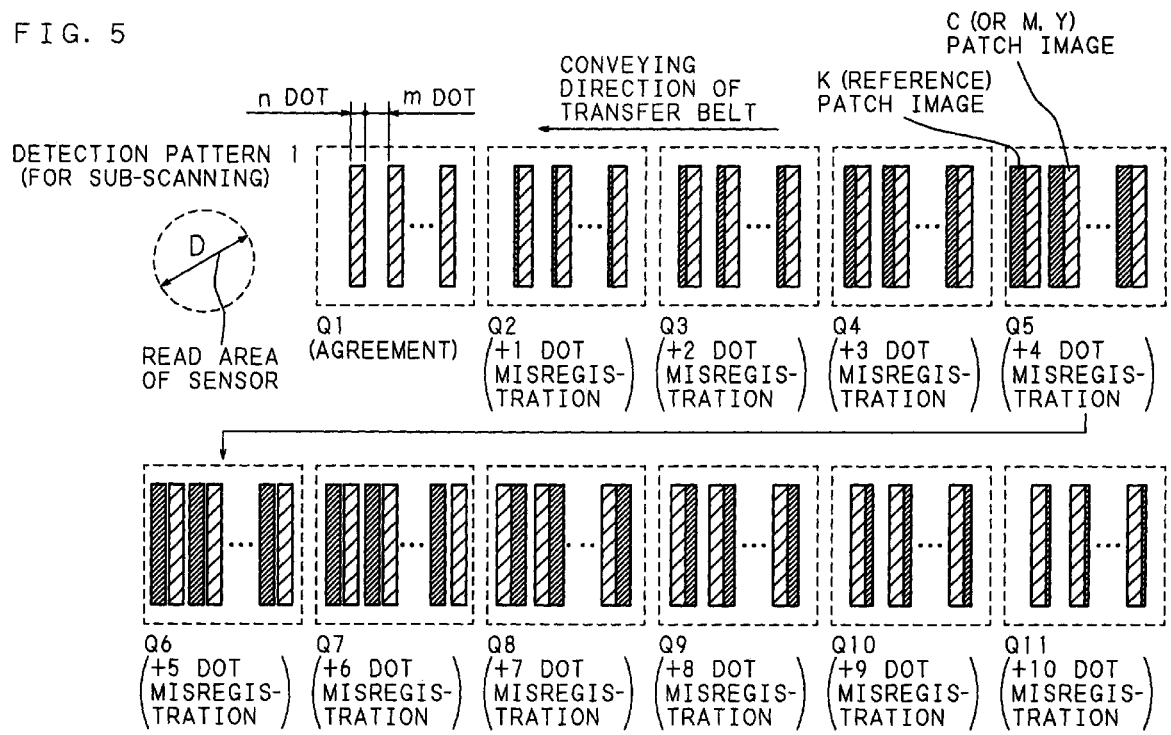
FIG. 5 is an explanatory diagram showing an example of a reference line and adjustment line in a first color matching adjustment in a sub-scanning direction formed on a transfer belt.

In succession, the density of the reference line and adjustment line formed on the transfer belt 7 is detected by the registration detecting sensor 21. The registration detecting sensor 21 detects the density of the reference line and adjustment line within the sensor reading range D as shown in FIG. 5 (an explanatory diagram showing examples of the reference line and adjustment line formed on the transfer belt 7). The sensor reading range D is about 10 mm in diameter, and is designed to average the detection error caused by color misregistration due to fine (slight) vibrations or the like. The reference patch image and adjustment patch image form a combination image (the area enclosed by dotted line in FIGS. 5 and 10). The combination images are composed by tens to hundreds of pieces per condition, and plural sets of combination images are formed depending on different conditions.

The density of the reference line and adjustment line on the transfer belt 7 is variable depending on the overlaying state of the reference line and adjustment line on the transfer belt 7. That is, depending on the degree of overlaying state of the reference line and adjustment line, the detection value of the reflection light detected by the registration detecting sensor 21 changes. The density detection result of the registration detecting sensor 21 varies with the combined area of the reference line and adjustment line formed on the surface of the transfer belt 7. When the area is minimum, that is, when the reference line and adjustment line are completely overlaid, the amount of the light emitted from the registration detecting sensor 21 being absorbed by the reference line and adjustment line decreases, while the reflection light from the transfer belt 7 is the maximum; therefore, the detection value (detection output) is high. When the transfer belt 7 is transparent, meanwhile, similar detection is possible by using the registration detecting sensor 21 of transmission type, instead of reflection type.

Thus, when the reference line and adjustment line are completely overlaid, the detection value is an extremal value. That is, when the image is formed in a condition of maximal detection value (or minimal detection value when a transparent transfer belt is used), a completely overlaid state of the reference line and adjustment line is obtained. In the first color matching adjustment, taking note that the detection value of the registration detecting sensor 21 has an extremal value when the reference line and adjustment line are overlaid completely, the color matching is adjusted by determining the extremal value of the detection value, but it is also possible to detect the completely deviated state of the reference line and adjustment line, that is, the minimal value.

Herein, since the nontransparent black transfer belt 7 is used, when the reference line and adjustment line are completely overlaid, the detection value of the registration detecting sensor 21 has an extremal value. Therefore, by forming the adjustment lines formed on the reference line image by deviating a specific rate, the overlaid state of the reference line and adjustment line is varied, and the detection value of the registration detecting sensor 21 is obtained in each state, and a maximal value of detection value is found.

Specifically, as mentioned above, in the case of composing of a plurality of lines of line width n of 4 dots and line interval m of each line of 7 dots, when the reference line and adjustment line are completely overlaid, as indicated by Q1 in FIG. 5, the reference line is completely covered with the adjustment line. That is, the registration detecting sensor 21 detects the density of the repeated images of the overlaid line width of 4 dots of reference line and 4 dots of adjustment line, and the line interval of 7 dots.

When the adjustment line is deviated from the forming position of the reference line by 1 dot each (supposing +1 dot) in the sub-scanning direction (moving direction of transfer belt), as indicated by Q2 in FIG. 5, the reference line is not completely covered with the adjustment line, and the overlap is deviated. That is, the registration detecting sensor 21 detects the line width for the portion of 3 overlaid dots of the reference line and adjustment line, the line width for the portion of 1 dot each of misregistration of the reference line and adjustment line, and the line interval for the portion of 6 dots. In other words, the registration detecting sensor 21 detects the density of the repeated images of the line width for the portion of 5 dots composed of the reference line and adjustment line and the line interval for the portion of 6 dots.

As shown in FIGS. 4 and 5, when the adjustment line is deviated by one dot each from the state of Q1 free from misregistration in the sub-scanning direction, the overlaid state of the reference line and adjustment line is changes from Q1 to Q11. When deviated by +11 dots from the state of Q1, as indicated by Q12 in FIG. 4, it is the repetition of line width of 4 dots of adjustment line and line interval of 7 dots, and the reference line and adjustment line are completely overlaid again. That is, when the adjustment line is deviated by 11 dots, it is same as the state before misregistration of adjustment line, and the same state is repeated every time the adjustment line is deviated by 11 dots.

Therefore, when deviated by +5 dots each from the position of −5 dots each from the predetermined state, creation and detection of reference line and adjustment line are terminated. That is, 11 types of combination image patterns are formed in the adjustment lines and their densities are detected to terminate the operation, from the position deviated by −5 dots, for example, from the median value ("50" when the color matching adjustment range is from "0" to "99") to a position deviated by +5 dots (adjustment value of "45" to "55" with respect to the reference line) in the color matching adjustable range.

If formed more, that is, 12 dots ("56"), 13 dots ("57"), . . . , only the same result is repeated. That is, in 11 types of conditions (within the adjustment range of 11 dots in the color matching adjustable range), the first color matching adjustment is executed, and it is set in a state capable of predicting the adjustment value of the exposure timing completely coinciding between the reference color component image and other color component image to be adjusted.

Figure 8:
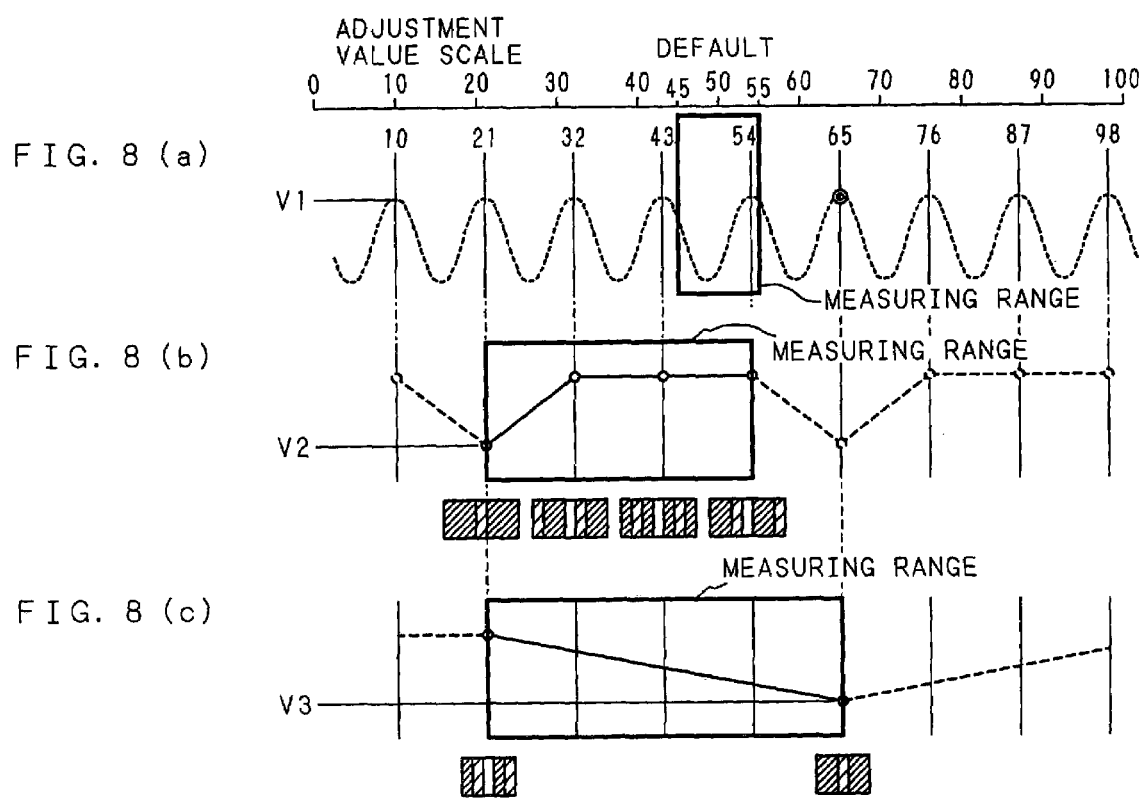
FIG. 8 is an explanatory diagram showing an example of a detection value of a registration detecting sensor.

As mentioned above, changes in overlaid state of the reference line and adjustment line are detected within a read area of sensor D (herein diameter D=10 mm) of the registration detecting sensor 21, and when the detection value is expressed graphically, as shown in FIG. 8(*a*), the completely overlaid state of the reference line and adjustment line, that is, the maximal point of the detection value (in this example, when the adjustment value is "54") is detected by output V1 as the agreement point.

However, this agreement point may not be always the true agreement point, and the true agreement point may be a point deviate from "54" by +11 dots (adjustment value "65"), +22 dots (adjustment value "76"), +33 dots (adjustment value "87"), +44 dots (adjustment value "98"), −11 dots (adjustment value "43"), −22 dots (adjustment value "32"), −33 dots (adjustment value "21"), or −44 dots (adjustment value "10").

That is, one of these nine points is the truly coinciding condition, and candidates of true agreement point can be predicted in this state. Therefore, by using the adjustment value corresponding to the maximal detection value of the registration detecting sensor 21, if the exposure timing of the exposure unit 1 for forming the adjustment line may be adjusted, the image of the reference color component and the image of other color component to be adjusted may be either completely overlaid or not.

(Second Color Matching Adjustment)

Accordingly, to determine the true agreement point of the reference color component image and the image of other color component to be adjusted, that is, the adjustment value as the true agreement point among the adjustment value ("54") determined in the first color matching adjustment and prediction values determined from this adjustment value, second color matching adjustment is executed for first reduction. In this second color matching adjustment, on the basis of the determined adjustment value ("54"), four prediction values including "54" (for example, "21", "32", "43", "54") are reduced. The four prediction values are not limited thereto, but may be any consecutive four prediction values.

Figure 6:
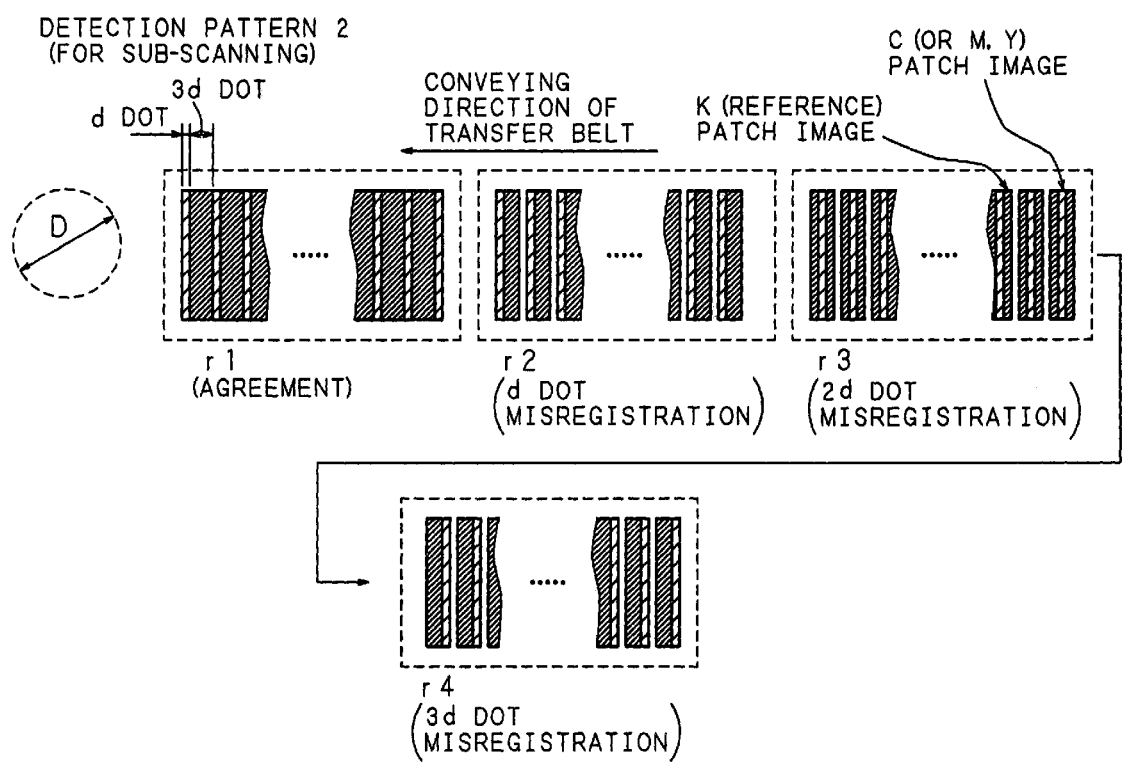
FIG. 6 is an explanatory diagram showing an example of a reference line and adjustment line in a second color matching adjustment in a sub-scanning direction formed on a transfer belt.

In the second color matching adjustment, on the basis of the timing at the maximal adjustment value determined in the first color matching adjustment, the exposure unit 1 exposes to write onto the photosensitive drum 3, and the reference patch image and adjustment patch image are formed on the transfer belt 7. The reference patch image and adjustment patch image formed at this time are based on the number of dots d (d=m+n) for the portion of one pitch of reference line and adjustment line of first color matching adjustment, and as shown in FIG. 6, the line width of the reference patch image is defined to be the number of dots of 3 times of d, and the line interval (width not forming line) of reference patch line is defined to be d. At the same time, the line width of the adjustment patch image is defined to be d, and the line interval (width not forming line) of adjustment patch line is defined to be the number of dots of 3 times of d, and the pattern forming pitch of the reference line and adjustment line is set respectively at 4d dots (44 dots).

In the second color matching adjustment, same as in the first color matching adjustment, with respect to the reference patch image, the adjustment patch image is formed by shifting by each number of dots relating to the pitch of the patch image at the time of first color matching adjustment, and the detection value of the registration detecting sensor 21 is determined. Specifically, as shown in FIG. 6, the adjustment line is formed by shifting every d dots corresponding to the width of the adjustment line.

In this second color matching adjustment, when the image position of the reference color component and the image position of other color component to be adjusted are completely matched, it is set so that the forming position of the reference patch image and the forming position of the adjustment patch image may be completely deviated. Accordingly, as shown in FIG. 8(*b*), in the state of forming the adjustment patch image between the reference patch images, that is, in a continuously linked state of the reference patch image and adjustment patch image (in a state free from gap in the sub-scanning direction on the transfer belt 7), the registration detecting sensor 21 detects the minimal value (output V2, adjustment value "21"), and the adjustment value of the agreement point is determined.

On the other hand, as shown in FIG. 8(*b*), when the adjustment patch image is formed on the reference patch image, the output value becomes high. In this case, the adjustment value corresponds to a deviated state of the image position of the reference color component and image position of other color component to be adjusted, and it means the adjustment value is not the true agreement point. Herein, if deviated by 4d dots (44 dots) from the obtained adjustment value "21", a same state can be predicted, and hence it is reduced that either adjustment value "21" or "65" may be the adjustment value of the true agreement point.

(Third Color Matching Adjustment)

Next, to determine which one of the two is the true agreement point, third color matching adjustment is executed. In the third color matching adjustment, on the basis of the adjustment value ("21") determined in the second color matching adjustment, two prediction values including "21" ("21", "65") are determined.

Figure 7:
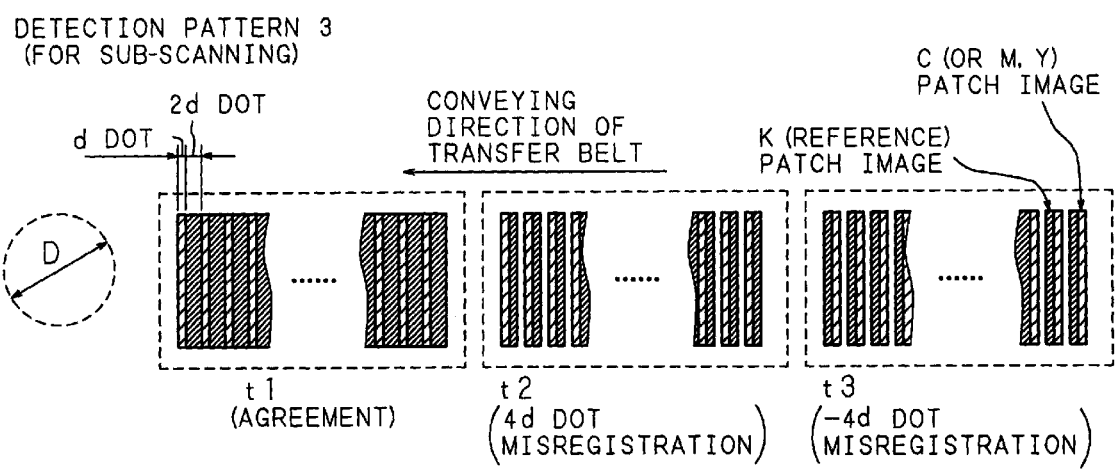
FIG. 7 is an explanatory diagram showing an example of a reference line and adjustment line in a third color matching adjustment in a sub-scanning direction formed on a transfer belt.

In the third color matching adjustment, on the basis of the timing at the maximal adjustment value determined in the first color matching adjustment, the exposure unit 1 exposes to write onto the photosensitive drum 3, and the reference patch image and adjustment patch image are formed on the transfer belt 7. The reference patch image and adjustment patch image formed at this time are based on the number of dots d (d=m+n) for the portion of one pitch of reference line and adjustment line of first color matching adjustment, and as shown in FIG. 7, the line width of the reference patch image is defined to be the number of dots of twice as d (2d), and the line interval (width not forming a line) of reference patch line is defined to be d. At the same time, the line width of the adjustment patch image is defined to be d, and the line interval (width not forming a line) of adjustment patch line is defined to be the number of dots of twice as d (2d), and the pattern forming pitch of the reference line and adjustment line is set respectively at 3d dots (33 dots).

In the third color matching adjustment, same as in the second color matching adjustment, with respect to the reference patch image, the adjustment patch image is formed by shifting by each number of dots relating to the pitch of the patch image at the time of second color matching adjustment, and the detection value of the registration detecting sensor 21 is determined. Specifically, as shown in FIG. 7, the adjustment line is formed by shifting every 4d dots (44 dots) corresponding to the line pitch in the second color matching adjustment.

In the third color matching adjustment, same as in the second color matching adjustment, when the image position of the reference color component and the image position of other color component to be adjusted are completely matched, it is set so that the forming position of the reference patch image and the forming position of the adjustment patch image may be completely deviated. Accordingly, as shown in FIG. 8(c), in the state of forming the adjustment patch image between the reference patch images, that is, in a continuously linked state of the reference patch image and adjustment patch image (in a state free from gap in the sub-scanning direction on the transfer belt 7), the registration detecting sensor 21 detects the minimal value (output V3, adjustment value "65"), and the adjustment value of the true agreement point is determined.

On the other hand, as shown in FIG. 8(c), when the adjustment patch image is formed on the reference patch image (adjustment value "21"), the output value becomes high. In this case, the adjustment value corresponds to a deviated state of the image position of the reference color component and image position of other color component to be adjusted, and it means the adjustment value is not the true agreement point.

In this manner, the color matching adjustment is executed in three steps, and prediction values of adjustment value corresponding to the agreement point are reduced, and the image of the reference color component and the image of color component to be adjusted can be matched completely, efficiently and easily, from the wide color matching adjustment range, and the exposure timing of the exposure unit 1 for forming the image of the object color component can be found and adjusted.

Figure 9:
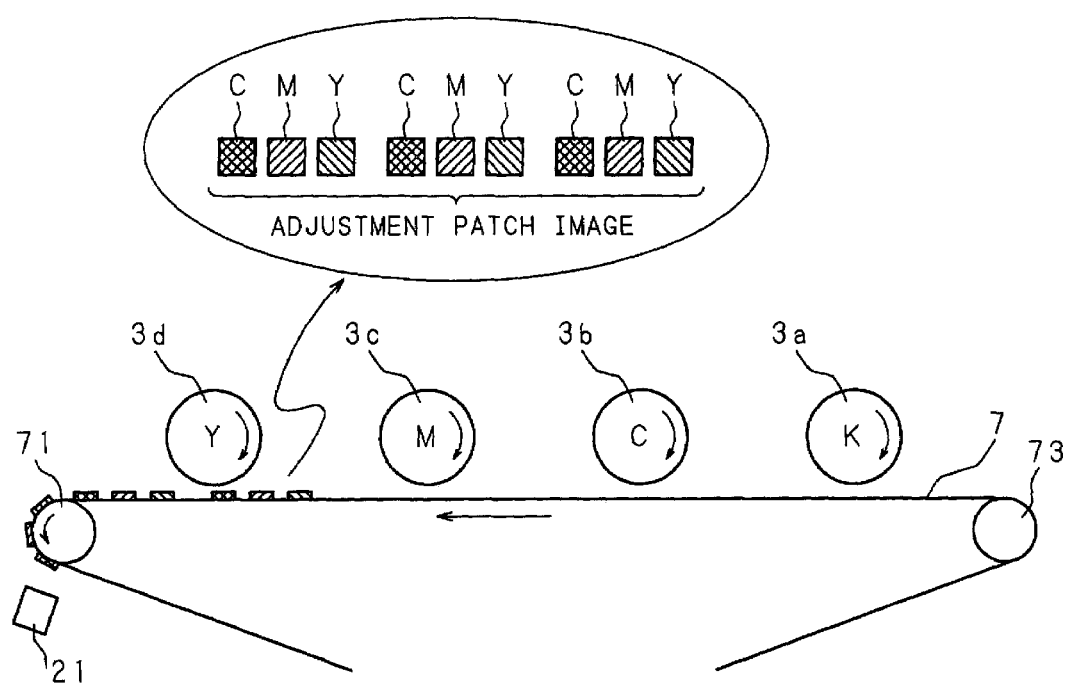
FIG. 9 is an explanatory diagram showing a case of parallel forming of a color component image to be adjusted.

In the description above, the color component image of one color to be adjusted is described specifically, and other color component images are adjusted similarly. The color component images to be adjusted may be adjusted either individually, or all color component images to be adjusted may be adjusted in parallel. FIG. 9 is a schematic diagram showing a procedure of parallel formation of color component images to be adjusted. For example, after forming the adjustment patch image of forming condition of cyan "45", the adjustment patch image of forming condition of magenta "45" is formed, and then the adjustment patch image of forming condition of yellow "45" is formed. Next, by sequentially updating the adjustment value of the forming condition, and adjustment patch images of cyan, magenta and yellow colors are formed.

In this example of color matching operation, the adjustment direction of the reference patch image and adjustment patch image to be formed on the transfer belt 7 is the sub-scanning direction, since color misregistration in the main scanning direction also exists, same as in the color matching adjustment in the sub-scanning direction, the reference patch image and adjustment patch image are formed in a direction at right angle to the adjustment direction in the sub-scanning direction, and color matching is adjusted similarly.

Figure 10:
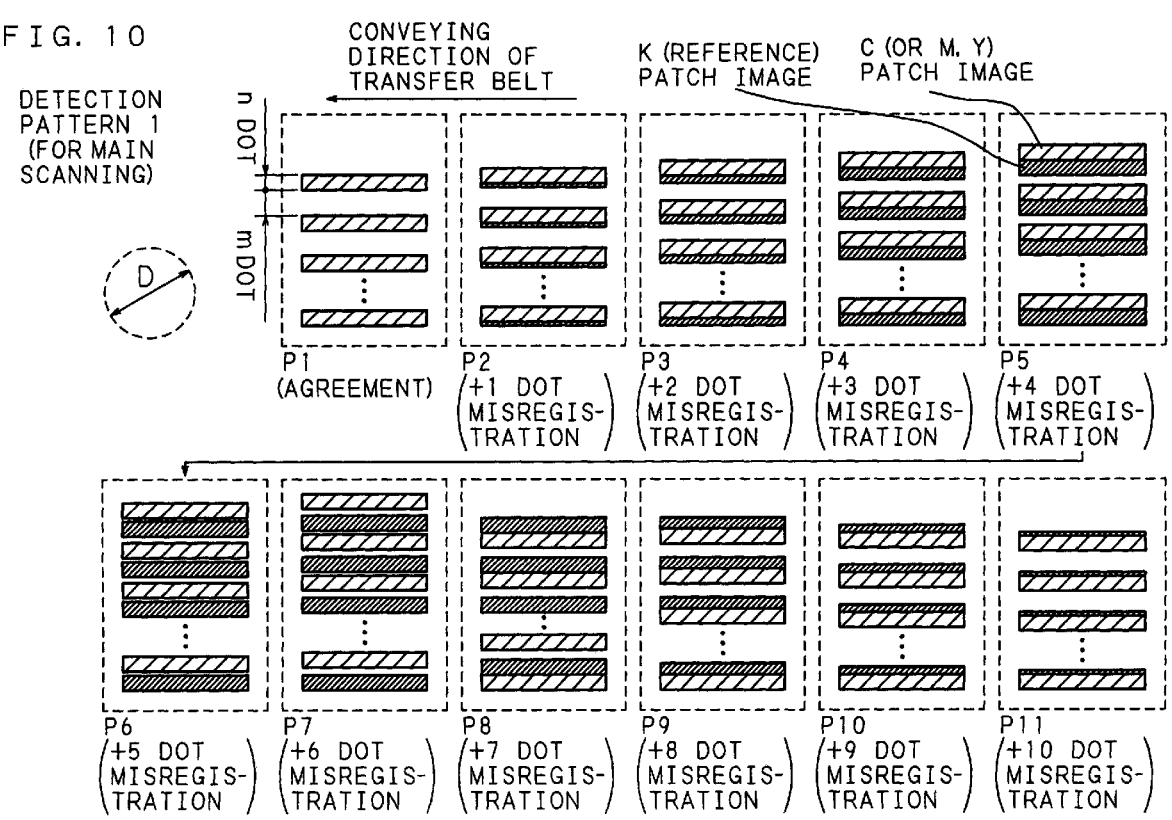
FIG. 10 is an explanatory diagram showing an example of a reference line and adjustment line in a first color matching adjustment in a main scanning direction formed on a transfer belt.
Figure 12:
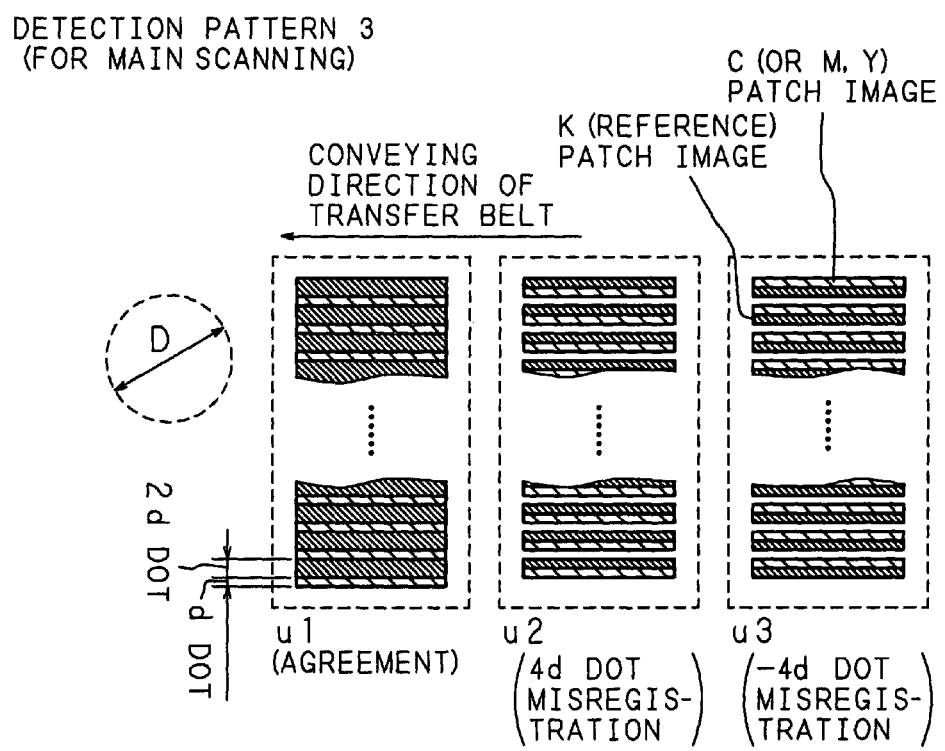
FIG. 12 is an explanatory diagram showing an example of a reference line and adjustment line in a third color matching adjustment in a main scanning direction formed on a transfer belt.

In this case, using the image forming pattern as shown in FIG. 10, first of all, as the first color matching adjustment, adjustment lines are formed by shifting sequentially within the range of pitch of image forming pattern, and the completely overlaying state of the reference patch image and adjustment patch image is searched. Next, as the second color matching adjustment, by the image forming pattern as shown in FIG. 11, the adjustment lines are shifted by each portion of pattern pitch in the first color matching adjustment, and non-overlaying state of a forming position of the reference patch image and a forming position of the adjustment patch image is searched. Further, as the third color matching adjustment, by the image forming pattern as shown in FIG. 12, the adjustment lines are shifted by each portion of pattern pitch in the second color matching adjustment, and color matching is adjusted, and it is adjusted by finding the exposure timing of complete agreement of the image of the reference color component and the image of the color component to be adjusted in the main scanning direction.

The color matching adjustment can be executed either in main scanning direction or sub-scanning direction, or on both of them. As a result, color misregistration in both main scanning direction and sub-scanning direction can be adjusted as required, and a favorable image may be obtained.

Figure 13:
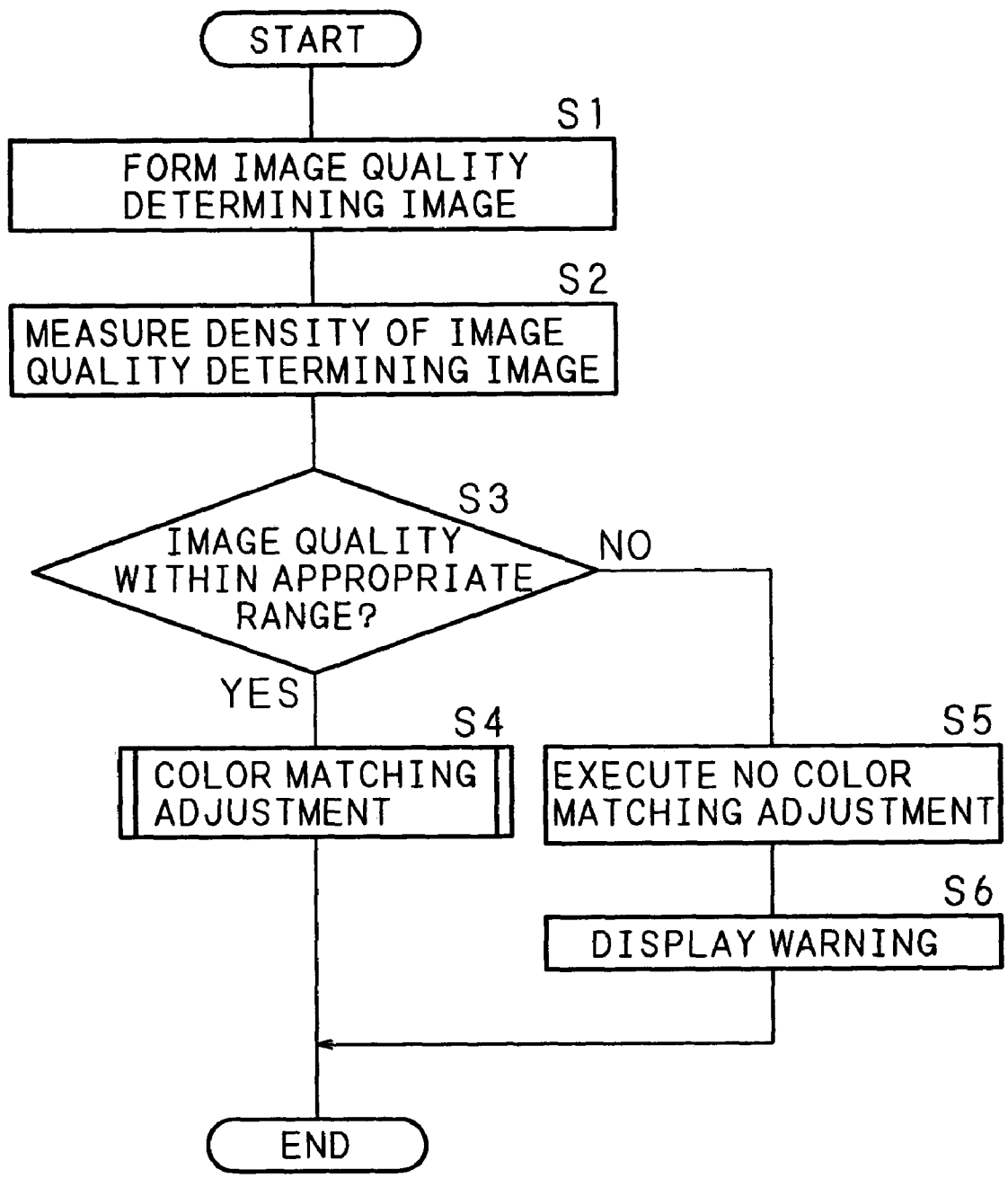
FIG. 13 is a flowchart showing an image adjusting method of an image forming apparatus in a first embodiment.
Figure 16:
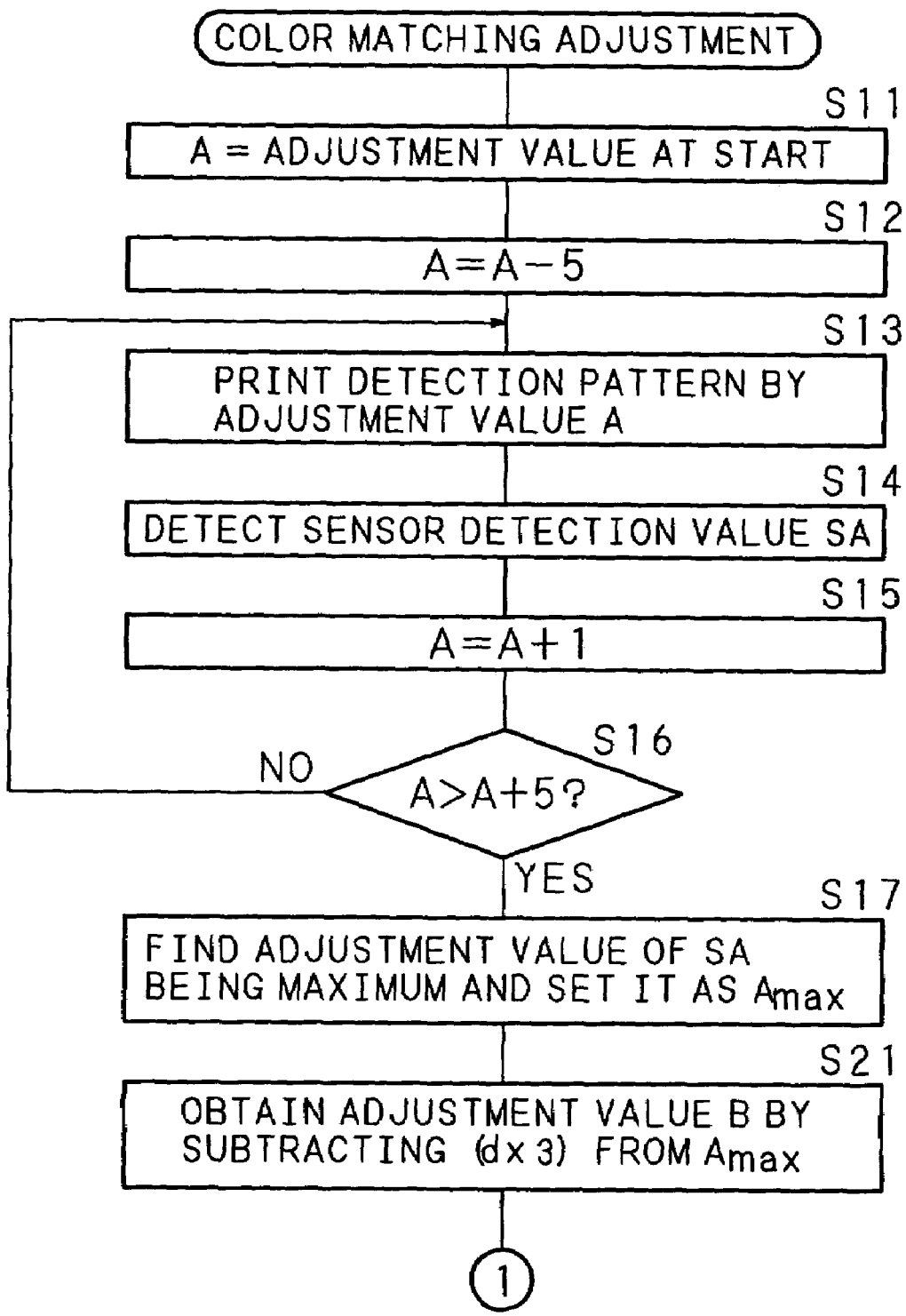
FIG. 16 is a flowchart showing an image adjusting method of an image forming apparatus in the first embodiment.
Figure 17:
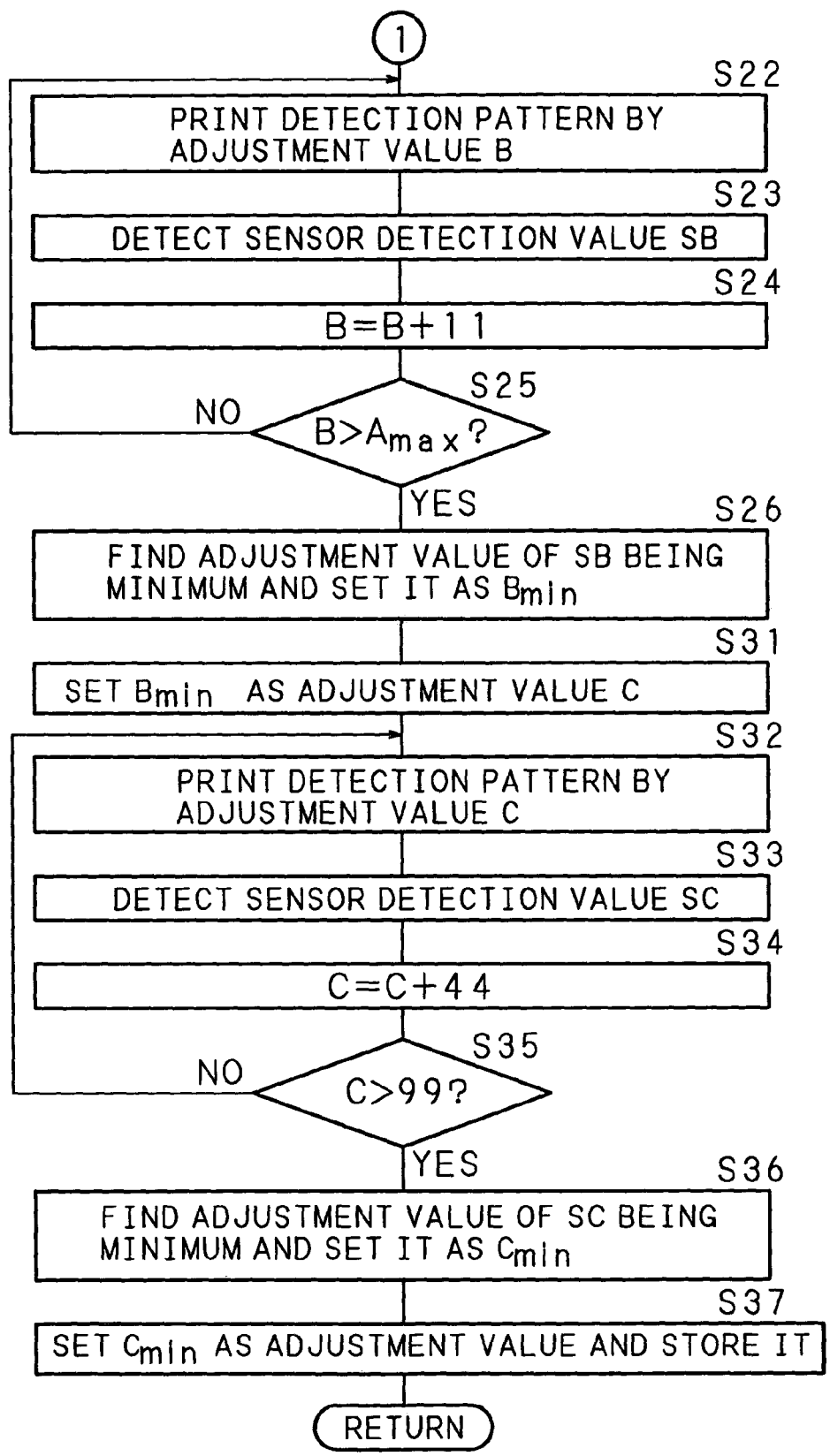
FIG. 17 is a flowchart showing an image adjusting method of an image forming apparatus in the first embodiment.

Hereinafter, description will be given of the image adjusting method of the image forming apparatus 100 in the first embodiment with reference to the flowcharts in FIGS. 13, 16 and 17 showing the operating procedure of adjustment.

Figure 15:
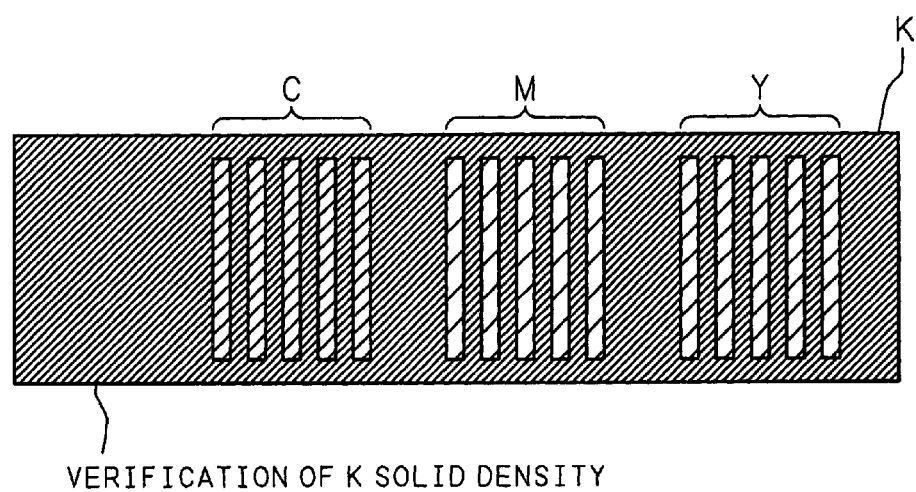
FIG. 15 is an explanatory diagram showing an example of an image for checking the image quality.
Figure 19:
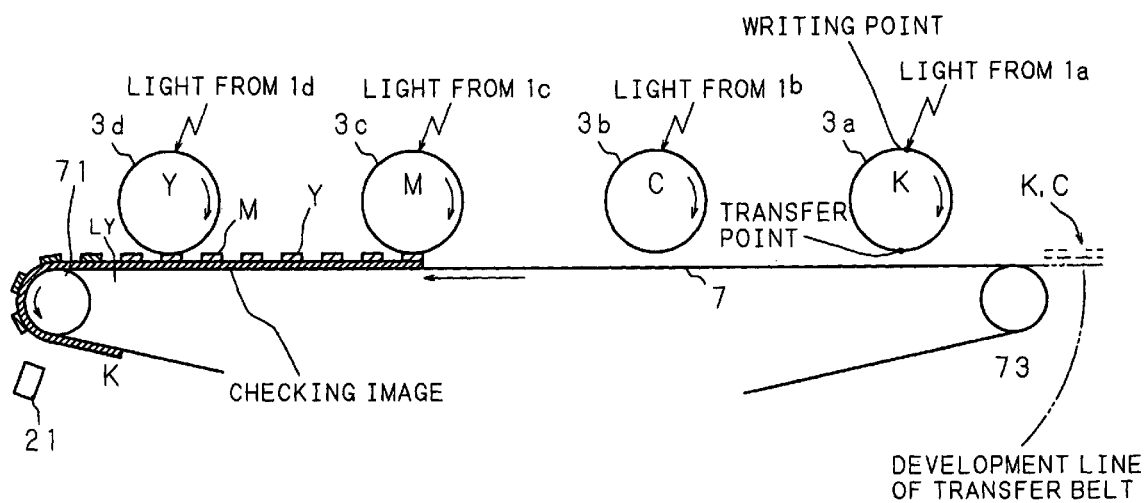
FIG. 19 is a schematic diagram showing a mode of forming an image for checking the image quality on the transfer belt.

The control unit 40 of the image forming apparatus 100 first allows the image forming station 80 to form an image (image quality determining image) for checking the quality (density, line forming state) (S1). The image for checking the quality is formed on the transfer belt 7, same as in the color matching adjustment described above and, as shown in FIG. 15, images of color components to be adjusted (C, M, Y) are formed on a solid image of reference color component (K) in a specified line width (same line width as adjustment line formed in the first color matching adjustment), and in a specified pitch (first interval: same pitch as adjustment line formed in the first color matching adjustment). FIG. 19 schematically shows a mode of forming the image for checking the image quality on the transfer belt 7.

Figure 14:
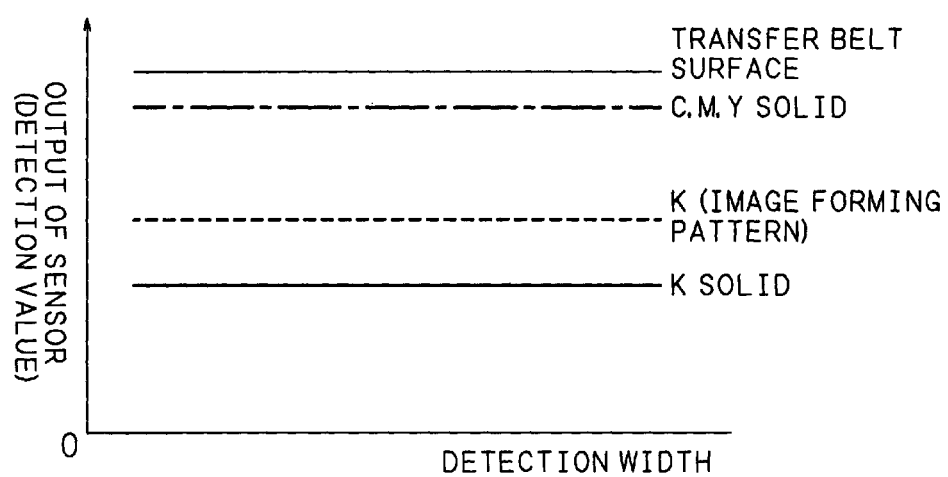
FIG. 14 is an explanatory diagram showing an example of a detection value of each color of a registration detecting sensor.

The reflected light from the solid image of color images (images of C, M, Y) is not so much different from the reflected light from the surface of the transfer belt 7 as shown in the output (detection value) of the registration detecting sensor 21 in FIG. 14. In FIG. 14, the detection value of the registration detecting sensor 21 is plotted on the axis of ordinates, and the detection width of the sensor 21 on the axis of abscissas. Therefore, when only the adjustment line image is formed on the transfer belt 7, the difference from the reflected light from the transfer belt 7 is further narrowed, and it is hard to determine whether the adjustment lines are formed favorably or not. Accordingly, on the solid image of the reference color component (solid image of K), a color image is formed in the same line width and same pitch as the adjustment lines, and it is used as the image for checking the image quality.

The output of the registration detecting sensor 21 is higher, as shown in FIG. 14, in the sequence of the case of detecting the surface of the transfer belt 7, the case of detecting the density of the solid image of color images (images of C, M, Y), the case of detecting the density of image forming pattern shown in FIG. 5 of the reference color component (K), and the case of detecting the density of the solid image of the reference color component (K).

The control unit 40 allows the registration detecting sensor 21 to detect the density of the image for checking the image quality (S2), and determines whether the image quality is within an appropriate range (specified image quality) or not on the basis of the detection value (S3). The control unit 40 determines the image quality is within an appropriate range, as mentioned above, when the output of the registration detecting sensor 21 is in a range of, for example, 1.36±0.26 V at the position of forming the color image on the K solid image in the same width and same pitch as the adjustment lines, and the output is in a range of, for example, 0.84±0.26 V at the position of the K (black) solid image.

When the control unit 40 determines that the image for checking the image quality is out of the appropriate range as the output of the registration detecting sensor 21 is high owing to low density, lack of reference line or lack of adjustment line (S3: NO), the color matching adjustment is not executed (S5), and a warning is displayed on a display screen of the operation unit 48, and a remedy is proposed (S6). When the control unit 40 determines that the image for checking the image quality is within the appropriate range as the output of the registration detecting sensor 21 is low (S3: YES), the color matching adjustment described above is executed successively (S4).

In the color matching adjustment, same as described above, the color matching adjustment range is 99 dots, and the color matching adjustment ranges from dot 0 to dot 99. In the detection pattern used in the first color matching adjustment, the pitch of patch image is 11 dots, the line width is 4 dots in both reference patch image and adjustment patch image, the line interval (width not forming a line) is 7 dots, and the deviation condition of adjustment lines is 1 dot.

In the detection pattern used in the second color matching adjustment, the pitch of patch image is 44 dots, the line width of reference patch image is 33 dots, its line interval is 11 dots, the line width of adjustment patch image is 11 dots, its line interval is 33 dots, and the deviation condition of adjustment lines is 11 dots. In the detection pattern used in the third color matching adjustment, the pitch of patch image is 33 dots, the line width of reference patch image is 22 dots, its line interval is 11 dots, the line width of adjustment patch image is 11 dots, its line interval is 22 dots, and the deviation condition of adjustment lines is 44 dots.

The control unit 40, at the time of executing the color matching adjustment, determines an arbitrary position of color matching adjustment range first as an adjustment value A upon start (S11). Generally, the adjustment value A is a median value of the color matching adjustment range, and in the case of adjustment range of 99 dots, the default value is A=50, which is set in the adjustment value storage unit 44. This adjustment value refers to the adjustment value of exposure timing of the exposure unit 1 of the image forming station for forming the adjustment patch image.

The control unit 40 subtracts 5 from the adjustment value A, and sets the balance as adjustment value A (S12). That is, when the initial value of the adjustment value is "50", the adjustment value A is "45". The control unit 40 allows the image forming station 80 to form (print) the detection pattern for the first color matching adjustment (S13).

Herein, the reference patch image for detection pattern is formed at a specified timing, but the adjustment patch image is formed at adjustment value A, that is, at adjustment value "45" of exposure timing. Specifically, the adjustment patch image (adjustment line) is formed at the timing of position of −5 dots to the forming position of the adjustment patch image by the default adjustment value. However, the initial value is not limited to "45", but may be set freely depending on the circumstance, and any value may be set (0 to 88) except for values larger than "88" (99−11=88).

Then, the control unit 40 allows the registration detecting sensor 21 to detect the density of the reference patch image and adjustment patch image on the transfer belt 7, and reads the detection value SA (S14). Next, adding 1 to the adjustment value A, the control unit 40 obtains adjustment value A (S15), and determines whether the adjustment value A exceeds (A+5), that is, "55" or not (S16). When the adjustment value A does not exceed (S16: NO), steps S13 to S16 are repeated.

On the other hand, when the adjustment value A exceeds (A+5) (S16: YES), the control unit 40 sets the adjustment value having the maximum SA of the detected SA values (S14) as $A_{max}$ (S17). That is, for 11 times (11 dots) of the adjustment value form "45" to "55", the density of image is detected while forming different images by 1 dot each in the position of the adjustment line. When the result of the first color matching adjustment is the result shown in FIG. 8(a), the agreement point (provisional agreement point) is $A_{max}$, and the adjustment value A of "54" at this time is set as $A_{max}$.

On the basis of the adjustment value $A_{max}$ ("54"), the control unit 40 determines the minimum value of four consecutive values, from the value subtracting a multiple of 11 from adjustment value $A_{max}$ to the value adding a multiple of 11 to $A_{max}$, as adjustment value B (S21). That is, of the values from ("54"−"44"="10") to ("54"+"44"="98"), four consecutive values "21", "32", "43", "54" before "54" are determined. The minimum value "21" of the four consecutive values is set as the initial value of adjustment value B. Herein, subtracting d×3=33 from adjustment value $A_{max}$, "21" is found.

Consequently, using the detection pattern for the second color matching adjustment, the control unit 40 forms an adjustment patch image at the position ("21") of reference patch image and adjustment value B (S22), allows the registration detecting sensor 21 to detect the density of the image composed of the reference patch image and adjustment patch image on the transfer belt 7, and reads the detection value SB (S23). Further, the control unit 40 adds the number of pitches 11 of the image forming pattern used in the first color matching adjustment to the adjustment value B, sets the adjustment value B as "32" (S24), and determines whether the adjustment value B exceeds the adjustment value $A_{max}$ ("54") or not (S25). Meanwhile, since the initial value of the adjustment value B is determined in the method described above, it is compared with the adjustment value $A_{max}$, but it may be also compared with the maximum value of four consecutive values.

Unless the adjustment value B exceeds the adjustment value $A_{max}$ ("54") (S25: NO), the control unit 40 repeats steps S22 to S25. On the other hand, the control unit 40, when the adjustment value B exceeds the adjustment value $A_{max}$ (S25: YES), finds the adjustment value B having the minimum SB value out of the detected values SB (S23), and sets it as $B_{min}$ (S26). When the result determined herein is the result shown in FIG. 8(b), the first time ("21") is the minimal value, and this is a candidate of agreement point. At this time, adding 4d to "21", "65" is also predicted to be a candidate of agreement point.

To determine which one of "21" and "65" is the true agreement point, the control unit 40 executes the third color matching adjustment. The control unit 40 sets $B_{min}$ as adjustment value C (S31), and forms (prints) reference patch image and adjustment patch image at position ("21") of adjustment value C by using detection pattern for the third color matching adjustment (S32). The control unit 40 allows the registration detecting sensor 21 to detect the density of the image composed of reference patch image and adjustment patch image on the transfer belt 7, and reads the detection value SC (S33).

The control unit 40 adds the number of pitches "44" of the image forming pattern (detection pattern) used the in second color matching adjustment to the adjustment value C, determines the adjustment value C as "65" (S34), and determines whether the adjustment value C exceeds the maximal adjustment value "99" or not (S35). When the adjustment value C does not exceed the maximal adjustment value "99" (S35: NO), the control unit 40 repeats steps S32 to S35.

On the other hand, when the adjustment value C exceeds the maximal adjustment value "99" (S35: YES), the control unit 40 finds the adjustment value C having the minimum SC value of the detected values SC (S33), and sets it as $C_{min}$ (S36). When the result determined herein is the result shown in FIG. 8(c), the second time ("65") is the minimal value, which is the true agreement point. The control unit 40 stores this value of "65" in the adjustment value storage unit 44 as the latest adjustment value (S37), and returns. The control unit 40 executes the color matching adjustment of other colors to be adjusted in parallel operation, and finds and stores the adjustment values in the adjustment value storage unit 44.

Figure 18:
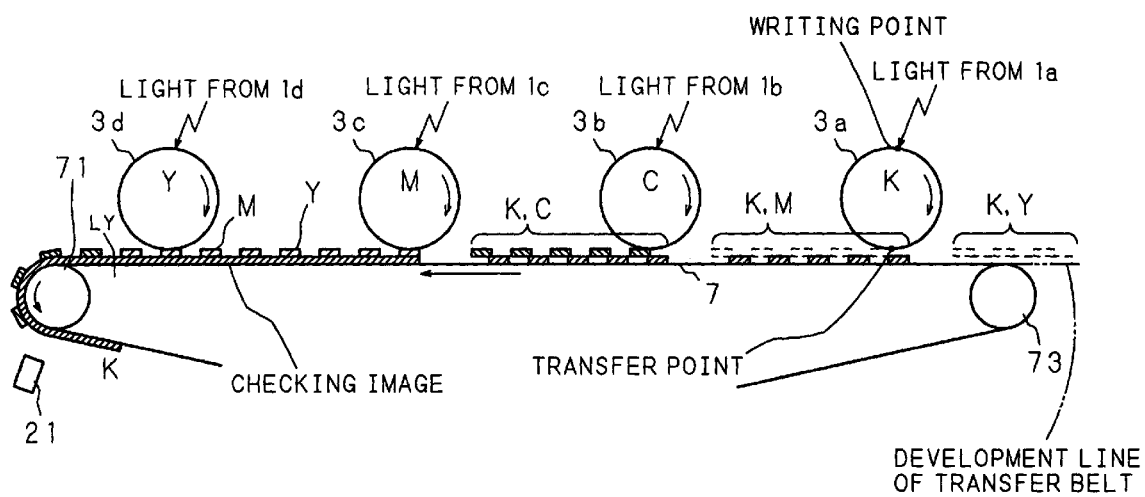
FIG. 18 is a schematic diagram showing a mode of forming a detection pattern for color matching adjustment of each color in succession to formation of an image for checking the image quality on the transfer belt.

FIG. 18 shows schematically a mode of forming a detection pattern for each color matching adjustment on the transfer belt 7 successively after forming the image for checking the image quality on the transfer belt 7. FIGS. 18 and 19 show the relation of forming positions of the image for checking the image quality and the image for the color matching adjustment. FIG. 19 shows a method of forming the image for the color matching adjustment after completion of checking of image quality, in which the image indicated by broken line at the right end is the image for the color matching adjustment, and an image for the color matching adjustment by K and C is formed. Herein, the position of the image forming station of C is far from the registration detecting sensor 21, but an image is formed at a timing so that the image is not formed before confirmation of checking result of image quality whether in K or C. Therefore, the image for the color matching adjustment cannot be formed unless the checking result of image quality is obtained, and it takes a somewhat longer time in adjustment, but wasteful image formation can be securely prevented.

By contrast, FIG. 18 shows an example of forming an image for the color matching adjustment sequentially to checking of image quality, and the adjustment time can be shortened, but wasteful images may be formed. However, by forming images for color matching adjustment alternately, that is, K and C, K and M, K and Y, K and C, K and M, and so forth, wasteful image formation may be less owing to the relation of the distance between the registration detecting sensor 21 and each image forming station, than the case of forming K and C, K and C, . . . , K and M, K and M, . . . , K and Y, K and Y, and so forth.

(Second Embodiment)

The image forming apparatus 100 in a second embodiment is designed to execute process control (adjustment process) for controlling the image forming condition, detection of image quality, and color matching adjustment by detecting the overlaid state of color component images.

In the process control, on the basis of the density of the patch image transferred on the transfer belt 7 (transfer carrier) through the photosensitive drum 3, and the environmental condition (temperature and humidity) of the environmental sensor which is not shown, it is controlled to form images favorably by varying, for example, the output or lighting time of the writing unit 41, development bias voltage of the developing section 42, grid bias voltage of the charging section 45, transfer bias voltage of the transfer section 47, and intermediate tone table of image processing unit (not shown).

In detection of image quality, the image quality is detected by detecting the density of image quality checking image transferred on the transfer belt 7 through the photosensitive drum 3, line forming state, and the like. In the color matching adjustment, by detecting the overlap of reference image formed by the reference color component and adjustment image formed by color component to be adjusted, the exposure timing of the exposure unit 1 is controlled so that two images may be overlaid securely.

Figure 20:
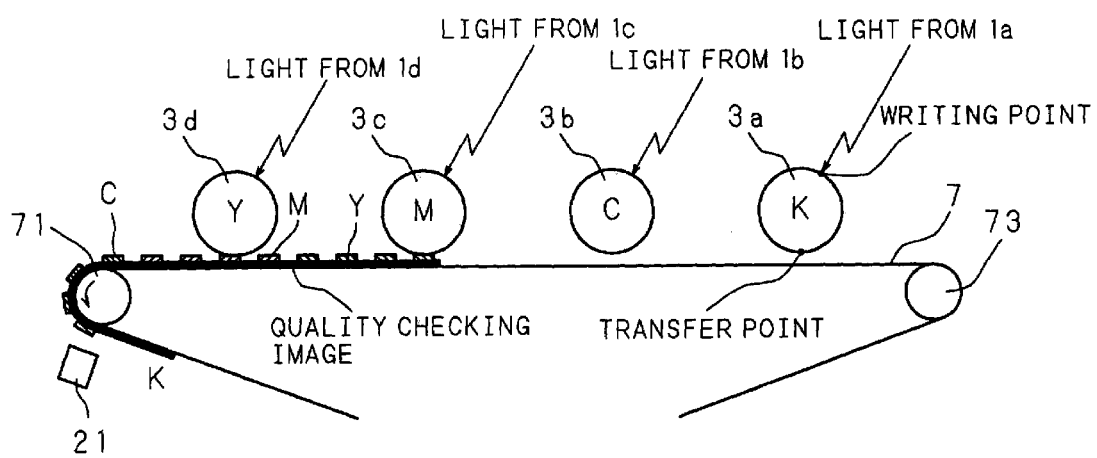
FIG. 20 is an explanatory diagram of operation at the time of forming an image for checking the image quality.

In the second embodiment, the patch image used in the process control, the quality checking image for checking the image quality, and the patch image used in the color matching adjustment are transferred as required on the transfer belt 7 if necessary. FIG. 20 is an explanatory diagram of operation at the time of forming a quality checking image. The transfer belt 7 is rotated and driven in a direction of arrow shown in the figure by the transfer belt driving roller 71 provided in the transfer conveying belt unit 8. Also as shown in FIG. 20, electrostatic latent images corresponding to the image data to be formed are formed on the photosensitive drums 3a, 3b, 3c, 3d of color components arranged by means of the exposure unit 1. As mentioned above, the exposure unit 1 controls the exposure timing depending on the image data.

The quality checking image is formed of a plurality of line images of color components of cyan (C), magenta (M) and yellow (Y) formed on the rectangular image of black (K). To form such quality checking image, first, the exposure unit 1a is exposed for a specific time, and an electrostatic latent image is formed on the photosensitive drum 3a, and a rectangular image of black (K) is transferred on the transfer belt 7, and the exposure timing of the exposure unit 1b is controlled in response to the pitch of the line image to be formed, and thereby an electrostatic latent image is formed on the photosensitive drum 3b, and a line image of cyan (C) is transferred. After stopping exposure of the exposure unit 1b, similarly, the line image of magenta (M) is transferred by using the exposure unit 1c and photosensitive drum 3c. Further, after stopping exposure of the exposure unit 1c, similarly, the line image of yellow (Y) is transferred by using the exposure unit 1d and photosensitive drum 3d.

Figure 21:
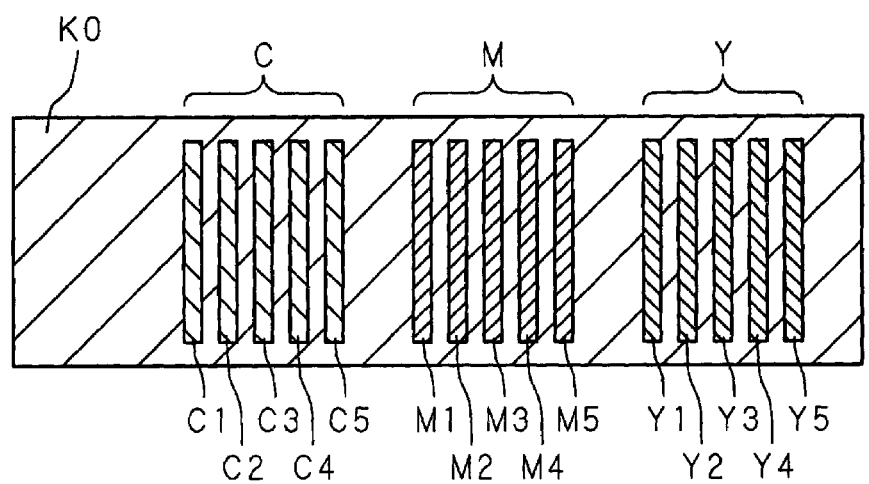
FIG. 21 is a schematic diagram showing an example of image for checking the image quality.

FIG. 21 is a schematic diagram describing an example of quality checking image. The quality checking image for checking the image quality (density, line forming state) is formed by forming a line image of other color component on a solid image K0 of reference color component (for example, black), in a specified line width (same line width as the adjustment line for detection pattern formed at the time of the first color matching adjustment) and a specified pitch (similarly, same pitch as the adjustment line for detection pattern). By the color of cyan (C), magenta (M) or yellow (Y), the reflected light from the formed solid image is not so much different from the reflected light from the surface of the transfer belt 7. Therefore, when only the line image is formed on the transfer belt 7, the difference from the light reflected from the transfer belt 7 is much smaller, and it is hard to determine whether the line image is formed favorably or not. Accordingly, on the solid image K0 of reference color component, line images C1 to C5, M1 to M5, and Y1 to Y5 are formed in the same line width and same line pitch as the adjustment lines, and these images are used for checking the quality.

Figure 22A:
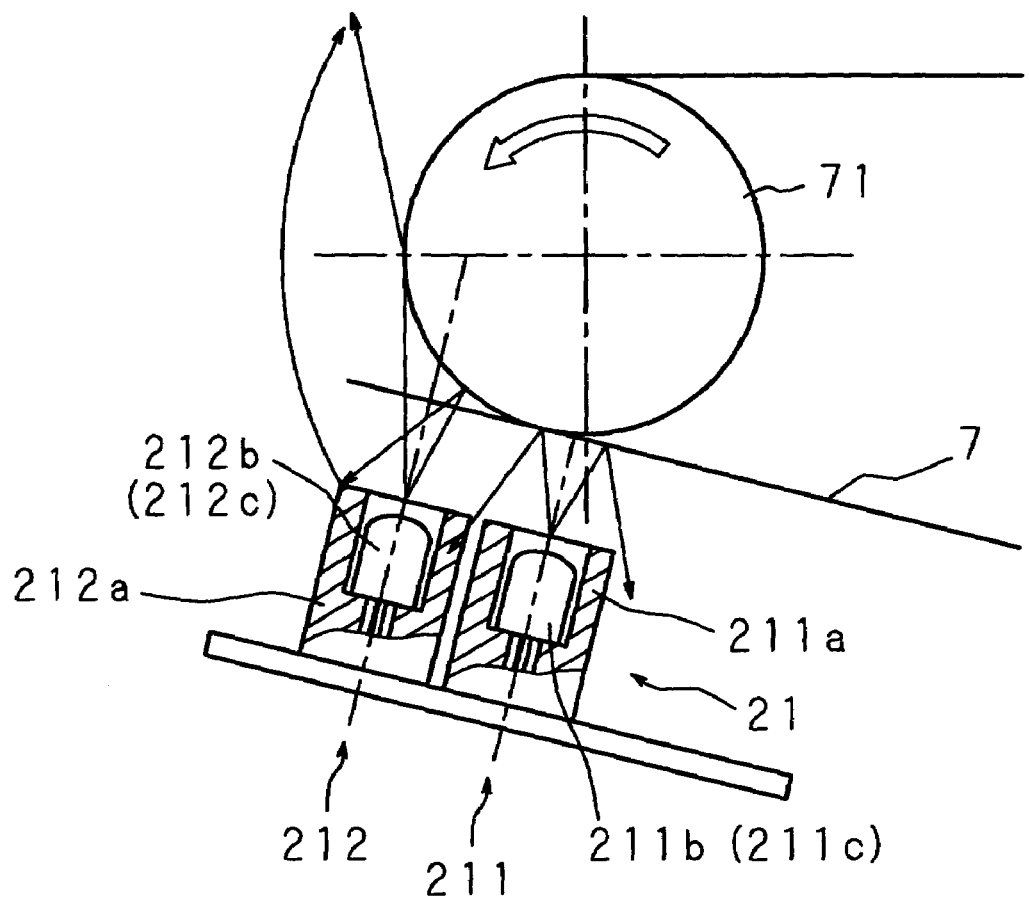
FIGS. 22A and 22B are schematic diagrams showing a configuration of a registration detecting sensor.
Figure 22B:
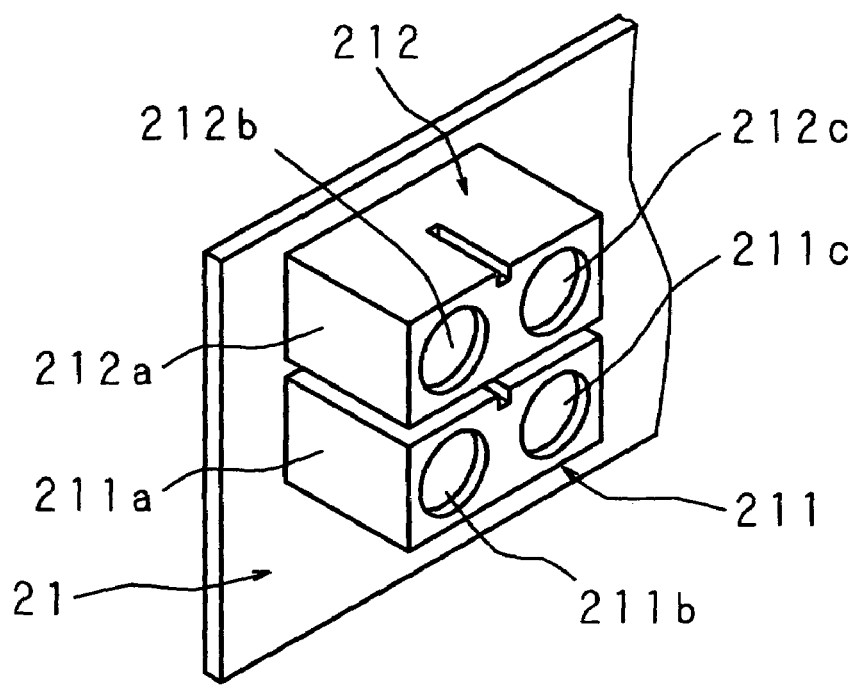

FIGS. 22A and 22B are schematic diagrams showing a configuration of the registration detecting sensor 21. The registration detecting sensor 21 includes a sensor unit 211 for detecting regular reflection light, and a sensor unit 212 for detecting random reflection light. The sensor unit 211 and sensor unit 212 are provided parallel to each other on a same board at a spacing of about 7 to 8 mm. The sensor unit 211 has an emitter 211b having an LED and a photo detector 211c having a PD (photo diode) provided in a box-shaped housing 211a. The registration detecting sensor 21 emits light to the transfer belt 7 from the emitter 211b, detects the reflected light of regular reflection on the transfer belt 7 by the photo detector 211c, and detects the density of the patch image.

The sensor unit 212 similarly has an emitter 212b having an LED and a photo detector 212c having a PD provided in a box-shaped housing 212a. The registration detecting sensor 21 emits light to the transfer belt 7 from the emitter 212b, detects the reflected light of random reflection on the transfer belt 7 by the photo detector 212c, and detects the density of the patch image. In the color matching adjustment, the density of the patch image is detected by using the sensor unit 211. In the process control which is the adjustment process, using both sensor unit 211 and sensor unit 212, the solid image K0 for the process control is measured by the sensor unit 211, and the densities of line images C1, M1, Y1 and the like are measured by the sensor unit 212.

In this embodiment, the registration detecting sensor 21 is partly used commonly in the color matching adjustment and adjustment process, but completely separate sensors may be provided. Instead of the two sensors 211, 212 used in the embodiment, it is also possible to use an integral type detection sensor having one emitter and two photo detectors (a detector for regular reflection light and a detector for random reflection light) provided in one case.

In FIG. 14 showing an example of result of detection by the registration detecting sensor 21, since the transfer belt 7 is black and glossy, the detection value by the registration detecting sensor 21 is high, and the reflection light from the solid image of color (C, M, Y) is not so much different from the reflection light from the surface of the transfer belt 7. On the other hand, the detection value from the solid image K0 of black as reference image is low, and by preparing an image quality checking image by forming line images of colors C1, M1, Y1 and the like in the same line width and line pitch as the adjustment lines, it can be easily distinguished from the output from the transfer belt 7.

In the detection result by the registration detecting sensor 21, it is set in this embodiment to determine to be in an appropriate range when the solid image K0 of black is within specified output range (for example, 0.84±0.26 V), and to be an error when out of this range. In the case of image quality checking image prepared by forming line images C1, M1, Y1 and the like on the solid image K0 in the same line width and line pitch as the adjustment lines, it is set in this embodiment to determine to be in an appropriate range when the detection value of the registration detecting sensor 21 is within specified output range (for example, 1.36±0.26 V), and to be an error when out of this range.

Figure 23:
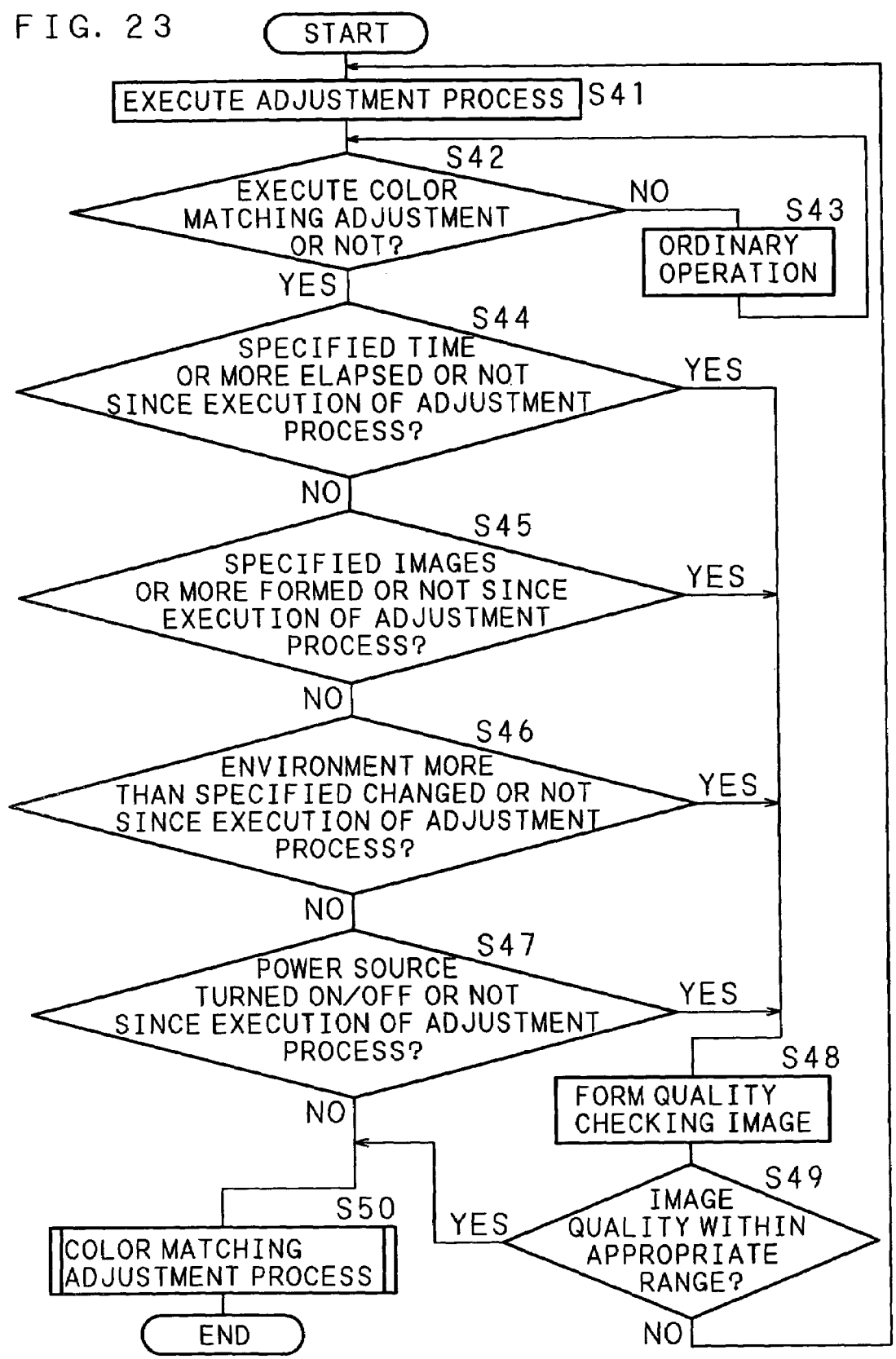
FIG. 23 is a flowchart showing an image adjusting method of an image forming apparatus in a second embodiment.

FIG. 23 is a flowchart describing the operation of the image forming apparatus 100 in the second embodiment. First, the control unit 40 of the image forming apparatus 100 executes an adjustment process described below (S41). The image forming apparatus 100 executes the adjustment process for controlling the various conditions of the process section, automatically or by detecting the image formed by an instruction from the operation unit 48 or the like, so that a normal image forming operation can be always maintained. This adjustment process includes a step of forming a patch image for the adjustment process and detecting the formed patch image, and a step of setting various conditions of the process section. Herein, the patch image for adjustment is patch images of colors having image densities in low, medium and high level. In the adjustment process, on the basis of the density of the patch image and the environmental condition (temperature and humidity) of the environment detection unit, for example, by varying the output or lighting time of the writing unit 41, development bias voltage of the developing section 42, grid bias voltage of the charging section 45, transfer bias voltage of the transfer section 47, and intermediate tone table of image processing unit (not shown), it is controlled to form an image favorably by adjusting the formed patch image for adjustment process to conform to a predetermined density.

Next, the control unit 40 determines whether or not to execute the color matching adjustment (S42), and when it is determined not to execute the color matching adjustment (S42: NO), the image forming by an ordinary operation is executed (S43). This ordinary operation includes waiting state, that is, a state of waiting for a signal instructing image formation or other process without forming image.

When it is determined to execute the color matching adjustment (S42: YES), the control unit 40 refers to the timer 52, and determines whether a specified time (for example, 2 hours) has elapsed or not since the execution of the adjustment process (S44). When it is determined that the specified time has elapsed since the execution of the adjustment process (S44: YES), it is considered that the conditions have been changed, such as the environmental state in the image forming apparatus 100, density of the developing agent, and fatigue of photosensitive body, and the quality checking image is formed (S48), and the image quality is determined to be within appropriate range or not (S49).

When it is determined that the specified time has not elapsed since the execution of the adjustment process (S44: NO), the control unit 40 refers to the counter 51, and determines whether a specified number of images (for example, 200 sheets) have been already formed or not since the execution of the adjustment process (S45). When it is determined that the specified number of images have been formed since the execution of the adjustment process (S45: YES), it is considered that the conditions have been changed, such as the environmental state in the image forming apparatus 100, density of the developer, and fatigue of photosensitive body, and the quality checking image is formed (S48), and the image quality is determined to be within appropriate range or not (S49).

When it is determined that the specified number of images have not been formed since the execution of the adjustment process (S45: NO), the control unit 40 determines whether an environmental change more than specified (for example, temperature change of 5 degrees or more, or humidity change of 10% or more) has been detected or not (S46). Environmental changes are detected by measuring the temperature and humidity in the image forming apparatus 100 by means of the temperature/humidity sensor 22. When the control unit 40 determines that the environment is changed more than specified (S46: YES), it is considered that the conditions have been changed in the image forming apparatus 100, such as characteristics of the sensors and driving units and photosensitive characteristic, and the quality checking image is formed (S48), and the image quality is determined to be within appropriate range or not (S49).

When it is determined that the environment has not been changed more than specified since the execution of the adjustment process (S46: NO), the control unit 40 determines whether the power source has been turned on or off or not since the execution of the adjustment process (S47), and when it is determined that the power source has been turned on or off (S47: YES), it is possible that some unit in the process section has been replaced when the power source is turned off, and effects on image forming quality may be considered, and the quality checking image is formed (S48), and the image quality is determined to be within appropriate range or not (S49).

When it is determined that the power source has not turned on or off since the execution of the adjustment process (S47: NO), or when the image quality of the quality checking image formed at step S48 is determined to be within an appropriate range (S49: YES), the color matching adjustment is executed (S50). When the image quality is not determined to be within an appropriate range (S49: NO), the operation returns to step S41.

Hereinafter, description will be specifically given of the color matching adjustment method using the image forming apparatus 100 in the second embodiment. The color matching adjustment in the second embodiment is executed by combination of the first to third color matching adjustments same as in the first embodiment. In the color matching adjustment in the second embodiment, description will be given of the processing procedure executed by the control unit 40.

Figure 24:
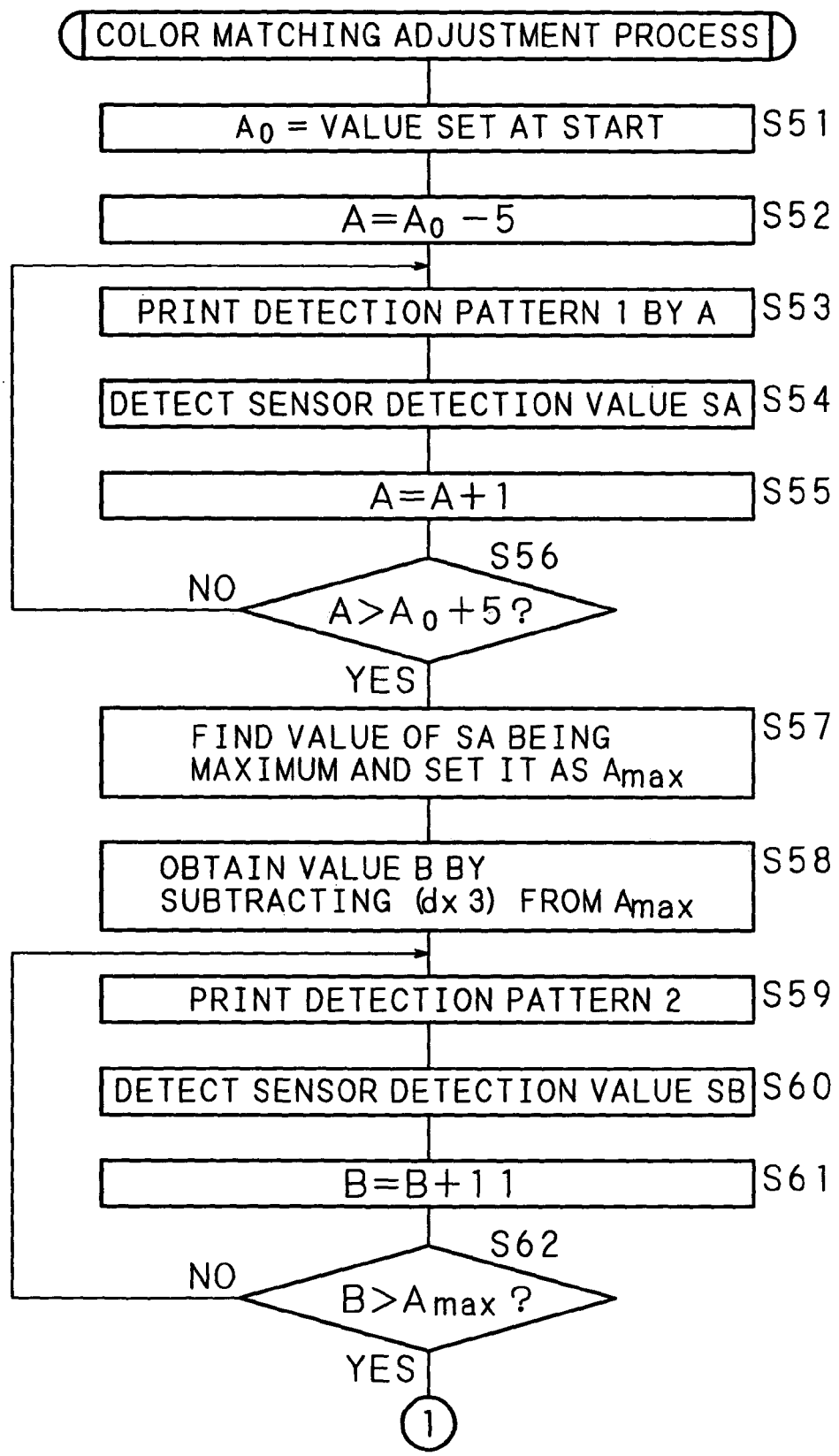
FIG. 24 is a flowchart showing a procedure of a color matching adjustment process in the second embodiment.
Figure 25:
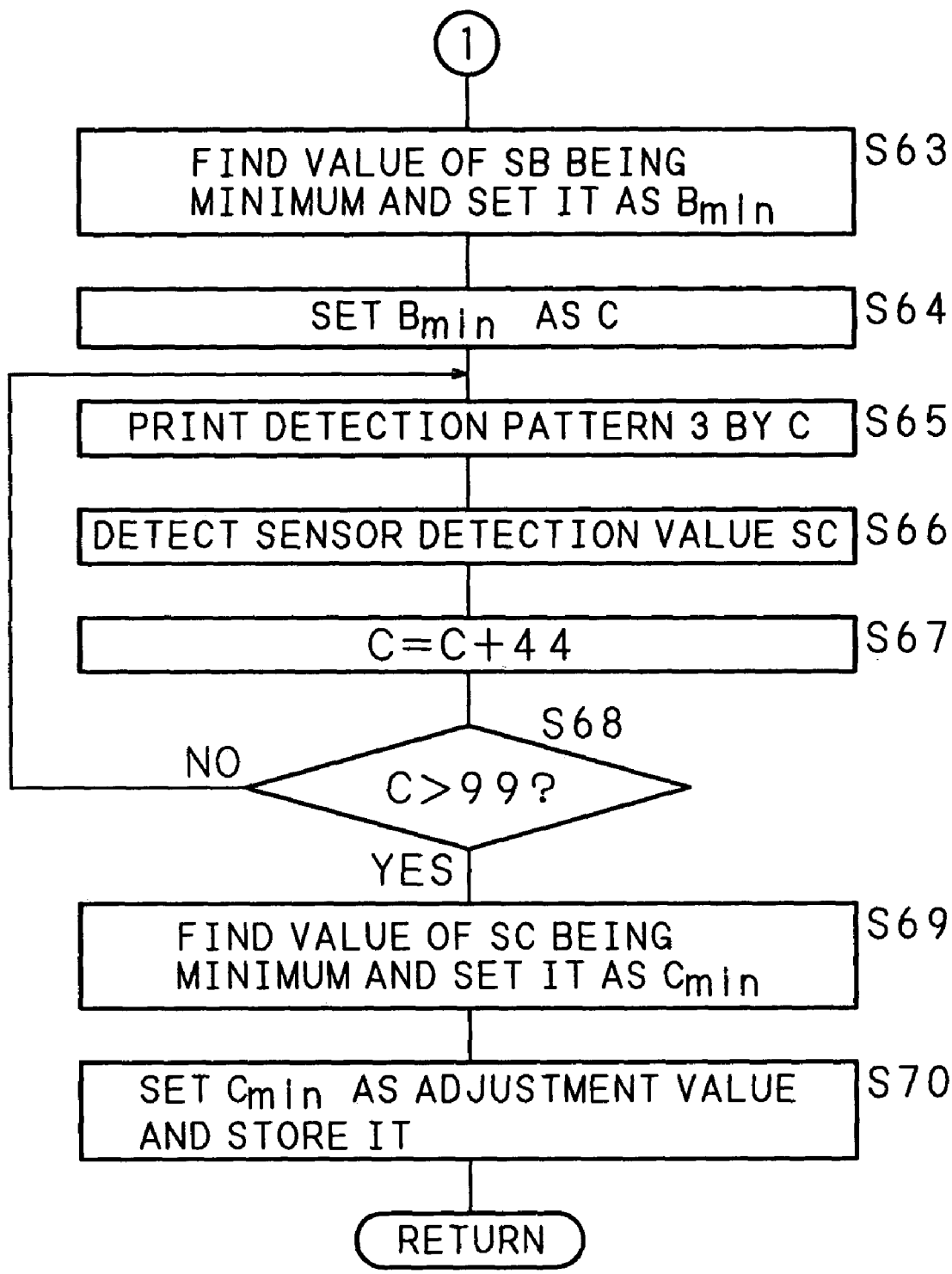
FIG. 25 is a flowchart showing a procedure of a color matching adjustment process in the second embodiment.

FIGS. 24 and 25 are flowcharts describing the processing procedure of the color matching adjustment. The color matching adjustment range is from dot 0 to dot 99. In the detection pattern used in the first color matching adjustment, the pitch of patch image is 11 dots, the line width is 4 dots in both reference patch image and adjustment patch image, the line interval is 7 dots, and the adjustment patch image is formed by sequentially shifting by 1 dot each.

In the detection pattern used in the second color matching adjustment, the pitch of patch image is 44 dots, the line width of reference patch image is 33 dots, its line interval is 11 dots, the line width of adjustment patch image is 11 dots, its line interval is 33 dots, and the adjustment patch image is formed by sequentially shifting by 11 dots each. In the detection pattern used in the third color matching adjustment, the pitch of patch image is 33 dots, the line width of reference patch image is 22 dots, its line interval is 11 dots, the line width of adjustment patch image is 11 dots, its line interval is 22 dots, and the adjustment lines are formed by sequentially shifting by 44 dots each.

First, the control unit 40 of the image forming apparatus 100 determines an arbitrary position of color matching adjustment range as a set value A0 upon start (S51). Generally, in the case of a median value of the color matching adjustment range, and 99 dots are in adjustment range, the default value is set as A0=50. Herein, the value of A refers to the adjustment value of exposure timing of the exposure unit 1 of the image forming station for forming the adjustment patch image.

The control unit 40 subtracts 5 from the value of A0, and sets the balance as A (S52). That is, when A0 is "50", the value of A is "45". Next, a detection pattern 1 is formed (S53). Herein, the reference patch image is formed at a specified timing, but the adjustment patch image is formed at adjustment value of "45". Specifically, the adjustment patch image (adjustment line) is formed at the timing of position of −5 dots to the forming position of the adjustment patch image by the default adjustment value. However, the initial value is not limited to "45", but may be set freely depending on the circumstance, and any value may be set (0 to 88) except for values larger than "88" (99−11=88).

The registration detecting sensor 21 measures the density of the reference patch image and adjustment patch image on the transfer belt 7, and detects the detection value SA (S54). Next, adding 1 to the value of A (S55), it is determined whether the value of A is larger than (A0+5) or not (S45). In step S26, when the value of A is smaller than (A0+5) (S66: NO), the process returns to step S53, and steps S53 to S56 are repeated.

On the other hand, when the value of A is more than (A0+5) (S56: YES), the value having the SA value as the maximal out of the detected SA values is set as $A_{max}$ (S57). That is, the concentration of image is detected while forming images by shifting the position of the adjustment line by 1 dot each until the adjustment value becomes "45" to "55". When the result of the first color matching adjustment is obtained as shown in FIG. 8(a), the agreement point (provisional agreement point) is $A_{max}$, and the adjustment value of "54" at this time is set as $A_{max}$.

Consequently, the control unit 40 executes the second color matching adjustment process in order to reduce agreement points. In the second color matching adjustment process, first, on the basis of $A_{max}$ ("54") determined in S57, the control unit 40 determines the minimum value of four consecutive values, from the value subtracting a multiple of 11 from $A_{max}$ to the value adding a multiple of 11 to $A_{max}$, as B (S58). That is, four consecutive values ("21", "32", "43", "54") out of the values from ("54"−"44"="10") to ("54"+"44"="98") are determined, and the minimum value "21" of the four consecutive values is set as the initial value of B. In this embodiment, subtracting (d×3=33) from $A_{max}$, "21" is found. Further, using the detection pattern 2, an adjustment patch image is formed at the position (adjustment value of "21") of reference patch image and value B (S59), and the registration detecting sensor 21 measures the density of the image composed of the reference patch image and adjustment patch image on the transfer belt 7, and the detection value SB is detected (S60).

Next, the control unit 40 adds the number of pitches 11 of the image forming pattern (detection pattern 1) used in the first color matching adjustment to the value of B (S61), and sets the value of B as "32". It is determined whether the value of B is larger than $A_{max}$ ("54") or not (S62). When the value of B is smaller (S62: NO), the process returns to step S59, and steps S59 to S62 are repeated. On the other hand, when the value of B is determined to be larger than $A_{max}$ (S62: YES), the value having the minimum SB value out of the values SB detected at S60 is determined, and this value is set as $B_{min}$ (S63). When the result is obtained as shown in FIG. 8(b), the adjustment value "21" is the minimal value, and this is a candidate of agreement point. At this time, adding 4d to "21", "65" is also predicted to be a candidate of agreement point.

To determine which one of "21" and "65" is the true agreement point, the third color matching adjustment is executed. The control unit 40 sets the value of $B_{min}$ as C (S64). Using detection pattern 3, a reference patch image is formed together with an adjustment patch image at position (adjustment value of "21") corresponding to the value of C (S65). The registration detecting sensor 21 measures the density of the image composed of reference patch image and adjustment patch image on the transfer belt 7, and the detection value SC is detected (S66). Adding the number of pitches 44 of the image forming pattern (detection pattern 2) used in the second color matching adjustment to the value of C (S67), the value of C is set as "65".

The control unit 40 determines whether the value of C is over the maximal value "99" or not (S68), and when the value of C smaller (S68: NO), the process is returned to step S65, and the processes of steps S65 to S68 are repeated. On the other hand, when the value of C is determined to be "99" or more (S68: YES), the value C having the minimum SC value out of the values SC detected at S66 is set as $C_{min}$ (S69). When the result determined herein is the result shown in FIG. 8(c), the minimal value of "65" is the true agreement point. This value of "65" is stored in the adjustment value storage unit 44 as the latest adjustment value (S70). Similarly, other colors are adjusted, and the obtained adjustment values of the colors to be adjusted are stored in the adjustment value storage unit 44.

The color matching adjustment in the first or second embodiment is the adjusting method in the initial phase of color matching adjustment, and when the image forming apparatus is assemble and installed in a place of actual use, this adjustment is executed at the time of replacing parts or after maintenance, and after color matching adjustment, the adjustment values are stored in the image forming apparatus, and the image forming apparatus forms images on the basis of the adjustment values. In this case, the color matching adjustment always includes the first color matching adjustment, second color matching adjustment and third color matching adjustment. After execution of the initial color matching adjustment, the power source of the image forming apparatus is turned on, and when registration is adjusted before execution of image formation, it is considered that large color misregistration occurs rarely, and hence the second color matching adjustment and third color matching adjustment may be omitted.

Further, after elapse of a specified time from turning on the power source, and after formation of images more than a specified number, it may be set to execute the color matching adjustment. In this case, color misregistration is hardly caused, and the second color matching adjustment and third color matching adjustment may be omitted, thereby substantially shortening the time for the color matching adjustment. Further, the color matching adjustment may be executed when the detection value of the temperature/humidity sensor 22 installed in the image forming apparatus is out of the predetermined range of temperature and humidity, or when the detection value of the temperature/humidity sensor 22 is changed suddenly.

Moreover, the serviceman or user is allowed to adjust the color matching by force when color misregistration is obvious after maintenance such as replacement of photosensitive drum, developing unit, and other process unit by the serviceman or user. In such cases, choices are provided for executing the first, second and third color matching adjustments completely, or executing only the first color matching adjustment.

Meanwhile, when reaching the condition for color matching adjustment, except when turning on the power source or executing color matching adjustment by force, instead of executing the color matching adjustment immediately, usually, it is executed after termination of the image forming job in process, or before start of next image forming job.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalent of such metes and bounds thereof are therefore intended to be embraced by the claims.

What is claimed is:

1. An image adjusting method for adjusting image forming positions of color component images so that a plurality of color component images are overlaid favorably, comprising:
   forming images based on each of a plurality of color components;
   transferring the formed images on each transfer medium to form an image quality determining image;
   detecting the density of the formed image quality determining image;
   determining the image quality of the image quality determining image on the basis of the detected density;
   forming an adjustment image by overlaying and transferring an image of other color component to be adjusted to a reference image of a reference color component out of the plurality of color components, on the transfer medium;
   detecting the density of the formed adjustment image; and
   adjusting the image forming position of the other color component on the basis of the detected density, wherein the adjustment image is formed after forming the image quality determining image.

2. The image adjusting method of claim 1, wherein the adjustment image is formed after determining the image quality of the image quality determining image.

3. The image adjusting method of claim 1, wherein the image quality determining image is formed by arranging a plurality of images of other color components to be adjusted at a first interval individually with being overlaid on the image of the reference color component.

4. The image adjusting method of claim 3, wherein the adjustment image is formed by overlaying the plurality of images to be adjusted on the plurality of reference images arranged and formed at a second interval, and the first interval is equal to the second interval.

5. The image adjusting method of claim 3, wherein the image quality determining image includes a portion formed only of the image of the reference color component.

6. The image adjusting method of claim 3, wherein the adjustment image is not formed when the result of determining the image quality of the image quality determining image does not reach a specified image quality.

7. An image adjusting method for adjusting image forming positions of color component images so that a plurality of color component images are overlaid favorably, comprising:
receiving information telling it necessary to adjust the image forming position of each color component image;
determining whether or not to execute a detection process for detecting the forming state of each color component image when receiving the information;
forming a detection image for detecting the forming state of each color component image when it is determined to execute the detection process;
executing the detection process on the basis of the formed detection image;
forming an adjustment image for adjusting the image forming position of each color component image; and
adjusting the image forming position of each color component image on the basis of the formed adjustment image.

8. The image adjusting method of claim 7, wherein the determination of whether or not to execute the detection process is determined on the basis of the elapse of time after execution of the detection process.

9. An image forming apparatus for forming an image by overlaying a plurality of color component images, comprising:
a plurality of image forming units for forming images based on each of a plurality of color components;
a plurality of transfer units for transferring the images formed by the image forming units on a transfer medium to be overlaid;
a detection unit for detecting the density of an image quality determining image formed by transferring on the transfer medium by each transfer unit;
an image quality determining unit for determining the image quality of the image quality determining image on the basis of the density detected by the detection unit; and
an adjustment unit for adjusting the image forming positions of other color components on the basis of the density detected by the detection unit as the detection unit detects the density of the adjustment image formed by transferring the image of other color to be adjusted to the reference image of the reference color component out of the plurality of color components, on the transfer medium by each transfer unit, wherein
each transfer unit forms the adjustment image after forming the image quality determining image.

10. The image forming apparatus of claim 9, wherein each transfer unit forms the adjustment image successively after the image quality determining unit determines the image quality.

11. The image forming apparatus of claim 9, wherein the image quality determining image is formed by arranging a plurality of images of other color components to be adjusted at a first interval individually with being overlaid on the image of the reference color component.

12. The image forming apparatus of claim 11, wherein the adjustment image is formed by overlaying the plurality of images to be adjusted on the plurality of reference images arranged and formed at a second interval, and the first interval is equal to the second interval.

13. The image forming apparatus of claim 11, wherein the image quality determining image includes a portion formed only of the image of the reference color component.

14. The image forming apparatus of claim 9, wherein each transfer unit does not form adjustment image when the result determined by the image quality determining unit does not reach a specified image quality.

15. An image forming apparatus for forming an image by overlaying a plurality of color component images, comprising:
a receiving unit for receiving information telling it necessary to adjust the image forming position of each color component image;
a determining unit for determining whether or not to execute a detection process for detecting the forming state of each color component image when the receiving unit receives the information;
a first forming unit for forming a detection image for detecting the forming state of each color component image when it is determined to execute the detection process;
an executing unit for executing the detection process on the basis of the formed detection image;
a second forming unit for forming an adjustment image for adjusting the image forming position of each color component image; and
an adjusting unit for adjusting the image forming position of each color component image on the basis of the formed adjustment image.

16. The image forming apparatus of claim 15, further comprising:
a control unit for controlling the forming condition of each color component image; and
a determining unit for determining whether or not to control the forming condition on the basis of the result of execution of the detection process.

17. The image forming apparatus of claim 15, further comprising:
a clock unit for measuring the elapse of time after execution of the detection process, wherein
the determining unit determines on the basis of the measured elapse of time.

18. The image forming apparatus of claim 15, further comprising:
a counting unit for counting the number of times of forming image, wherein
the determining unit determines on the basis of the counted number of times.

19. The image forming apparatus of claim 15, further comprising:
a measuring unit for measuring the temperature or humidity at the time of image forming, wherein
the determining unit determines on the basis of the measured temperature or humidity.

20. The image forming apparatus of claim 15, further comprising:
a counting unit for counting the number of times of turning on a power source to be supplied, wherein
the determining unit determines on the basis of the counted number of times.

21. The image forming apparatus of claim 15, wherein the detection image is an image formed by overlaying a lattice image of other color component on an image of one color component.

22. The image forming apparatus of claim 15, wherein the adjustment image is an image formed by overlaying lattice images of color components.

* * * * *